(12) United States Patent
Tsujimoto

(10) Patent No.: US 12,064,821 B2
(45) Date of Patent: Aug. 20, 2024

(54) CUTTING INSERT FOR ROTARY CUTTING TOOL, AND ROTARY CUTTING TOOL

(71) Applicant: Sumitomo Electric Hardmetal Corp., Itami (JP)

(72) Inventor: Shota Tsujimoto, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 469 days.

(21) Appl. No.: 17/607,032

(22) PCT Filed: Dec. 24, 2020

(86) PCT No.: PCT/JP2020/048428
§ 371 (c)(1),
(2) Date: Oct. 28, 2021

(87) PCT Pub. No.: WO2022/137422
PCT Pub. Date: Jun. 30, 2022

(65) Prior Publication Data
US 2022/0203459 A1    Jun. 30, 2022

(51) Int. Cl.
*B23C 5/06* (2006.01)
*B23C 5/20* (2006.01)

(52) U.S. Cl.
CPC ............... *B23C 5/06* (2013.01); *B23C 5/202* (2013.01); *B23C 2200/0411* (2013.01);
(Continued)

(58) Field of Classification Search
CPC ............... B23C 5/202; B23C 2200/0411; B23C 2200/0483; B23C 200/125;
(Continued)

(56) References Cited

U.S. PATENT DOCUMENTS 4,294,566 A * 10/1981 Boone ................. B23B 27/1622
407/104
6,945,740 B2 * 9/2005 Svenningsson ......... B23C 5/202
407/42
(Continued)

FOREIGN PATENT DOCUMENTS

JP      2013-6221 A      1/2013
JP      2013000842 A *   1/2013
(Continued)

*Primary Examiner* — Sara Addisu
(74) *Attorney, Agent, or Firm* — XSENSUS LLP

(57) ABSTRACT

A cutting insert for a rotary cutting tool has a second surface that includes a second seating surface having a shape of a flat surface. The first cutting edge has a first main cutting edge portion and a first sub cutting edge portion. The second cutting edge has a second main cutting edge portion and a second sub cutting edge portion. When viewed in a direction from the first surface toward the second surface, at least a portion of the second sub cutting edge portion is located outside the first main cutting edge portion, and at least a portion of the first sub cutting edge portion is located outside the second main cutting edge portion. When viewed in the direction from the first surface toward the second surface, each of the first sub cutting edge portion and the second sub cutting edge portion has a shape of a curved line.

13 Claims, 20 Drawing Sheets

(52) U.S. Cl.
CPC ........... *B23C 2200/0483* (2013.01); *B23C 2200/125* (2013.01); *B23C 2200/20* (2013.01); *B23C 2200/28* (2013.01); *B23C 2200/365* (2013.01); *B23C 2210/50* (2013.01)

(58) Field of Classification Search
CPC ........... B23C 2200/20; B23C 2210/50; B23C 2200/0494; B23C 2200/203; B23C 2200/369; B23C 5/109; B23C 5/06; B23C 2200/128; B23C 2200/287; B23C 2200/284; B23C 2200/28; B23C 2200/365
See application file for complete search history.

(56) References Cited

U.S. PATENT DOCUMENTS

| | | | | |
|---|---|---|---|---|
| 6,966,729 | B2* | 11/2005 | Dehn | B23C 5/22 407/116 |
| 8,740,509 | B2* | 6/2014 | Luik | B23C 5/202 407/42 |
| 8,974,156 | B2* | 3/2015 | Burtscher | B23C 5/202 407/115 |
| 9,144,848 | B2* | 9/2015 | Konta | B23C 5/109 |
| 9,555,489 | B2* | 1/2017 | Takahashi | B23C 5/2213 |
| 11,285,550 | B2* | 3/2022 | Tabe | B23C 5/2213 |
| 2012/0275868 | A1 | 11/2012 | Saito et al. | |
| 2013/0028670 | A1* | 1/2013 | Luik | B23C 5/202 407/66 |
| 2013/0129432 | A1 | 5/2013 | Jaeger et al. | |
| 2014/0334890 | A1* | 11/2014 | Takahashi | B23C 5/205 407/40 |
| 2019/0015911 | A1 | 1/2019 | Hagiwara et al. | |
| 2020/0023444 | A1* | 1/2020 | Saitoh | B23C 5/06 |
| 2021/0237170 | A1* | 8/2021 | Saitoh | B23C 5/06 |

FOREIGN PATENT DOCUMENTS

| | | | |
|---|---|---|---|
| JP | 2013-107198 A | 6/2013 | |
| JP | 2014121770 A * | 7/2014 | ........... B22F 7/06 |
| JP | 2017-124464 A | 7/2017 | |
| JP | 2017-528329 A | 9/2017 | |
| WO | 2013/088851 A1 | 6/2013 | |
| WO | 2014/081011 A1 | 5/2014 | |
| WO | 2015/002312 A1 | 1/2015 | |
| WO | 2016/046811 A1 | 3/2016 | |
| WO | 2017/122715 A1 | 7/2017 | |

* cited by examiner

CUTTING INSERT FOR ROTARY CUTTING TOOL, AND ROTARY CUTTING TOOL

CROSS-REFERENCE TO RELATED APPLICATION

The present application is based on PCT filing PCT/JP2020/048428, filed Dec. 24, 2020, the entire contents of which are incorporated herein by reference.

TECHNICAL FIELD

The present disclosure relates to a cutting insert for a rotary cutting tool, and a rotary cutting tool.

BACKGROUND ART

Japanese Patent Laying-Open No. 2017-124464 (PTL 1) describes a cutting insert having a main cutting edge and a sub cutting edge. In a top view, each of the main cutting edge and the sub cutting edge has a shape of a straight line.

CITATION LIST

Patent Literature

PTL 1: Japanese Patent Laying-Open No. 2017-124464

SUMMARY OF INVENTION

A cutting insert for a rotary cutting tool in accordance with the present disclosure includes a first surface, a second surface, and an outer circumferential surface. The second surface is opposite to the first surface. The outer circumferential surface is contiguous to each of the first surface and the second surface. A ridgeline between the first surface and the outer circumferential surface includes a first cutting edge. A ridgeline between the second surface and the outer circumferential surface includes a second cutting edge. The first surface includes a first seating surface having a shape of a flat surface. The second surface includes a second seating surface having a shape of a flat surface. The first cutting edge has a first main cutting edge portion and a first sub cutting edge portion. The second cutting edge has a second main cutting edge portion and a second sub cutting edge portion. When viewed in a direction from the first surface toward the second surface, at least a portion of the second sub cutting edge portion is located outside the first main cutting edge portion, and at least a portion of the first sub cutting edge portion is located outside the second main cutting edge portion. When viewed in the direction from the first surface toward the second surface, each of the first sub cutting edge portion and the second sub cutting edge portion has a shape of a curved line. The outer circumferential surface includes a third seating surface having a shape of a flat surface.

A cutting insert for a rotary cutting tool in accordance with the present disclosure includes a first surface, a second surface, and an outer circumferential surface. The second surface is opposite to the first surface. The outer circumferential surface is contiguous to each of the first surface and the second surface. A ridgeline between the first surface and the outer circumferential surface includes a first cutting edge. A ridgeline between the second surface and the outer circumferential surface includes a second cutting edge. The first surface includes a first seating surface having a shape of a flat surface. The second surface includes a second seating surface having a shape of a flat surface. The first cutting edge has a first main cutting edge portion and a first sub cutting edge portion. The second cutting edge has a second main cutting edge portion and a second sub cutting edge portion. When viewed in a direction from the first surface toward the second surface, at least a portion of the second sub cutting edge portion is located outside the first main cutting edge portion, and at least a portion of the first sub cutting edge portion is located outside the second main cutting edge portion. When viewed in the direction from the first surface toward the second surface, each of the first sub cutting edge portion and the second sub cutting edge portion has a shape of a curved line. The outer circumferential surface includes a third seating surface having a shape of a flat surface. In a cross section which is parallel to the direction from the first surface toward the second surface and which intersects the first main cutting edge portion, the third seating surface, and the second sub cutting edge portion, an angle formed between the third seating surface and the first seating surface is an obtuse angle, and an angle formed between the third seating surface and the second seating surface is an acute angle. When viewed in the direction from the first surface toward the second surface, the ridgeline between the first surface and the outer circumferential surface has a shape with a rotational symmetry of 120° about a central axis.

A cutting insert for a rotary cutting tool in accordance with the present disclosure includes a first surface, a second surface, and an outer circumferential surface. The second surface is opposite to the first surface. The outer circumferential surface is contiguous to each of the first surface and the second surface. A ridgeline between the first surface and the outer circumferential surface includes a first cutting edge. A ridgeline between the second surface and the outer circumferential surface includes a second cutting edge. The first surface includes a first seating surface having a shape of a flat surface. The second surface includes a second seating surface having a shape of a flat surface. The first cutting edge has a first main cutting edge portion and a first sub cutting edge portion. The second cutting edge has a second main cutting edge portion and a second sub cutting edge portion. When viewed in a direction from the first surface toward the second surface, at least a portion of the second sub cutting edge portion is located outside the first main cutting edge portion, and at least a portion of the first sub cutting edge portion is located outside the second main cutting edge portion. When viewed in the direction from the first surface toward the second surface, each of the first sub cutting edge portion and the second sub cutting edge portion has a shape of a curved line. The outer circumferential surface includes a third seating surface having a shape of a flat surface. In a cross section which is parallel to the direction from the first surface toward the second surface and which intersects the first main cutting edge portion, the third seating surface, and the second sub cutting edge portion, an angle formed between the third seating surface and the first seating surface is an obtuse angle, and an angle formed between the third seating surface and the second seating surface is an acute angle. When viewed in the direction from the first surface toward the second surface, the ridgeline between the first surface and the outer circumferential surface has a shape with a rotational symmetry of 180° about a central axis.

DETAILED DESCRIPTION

Figure 1:
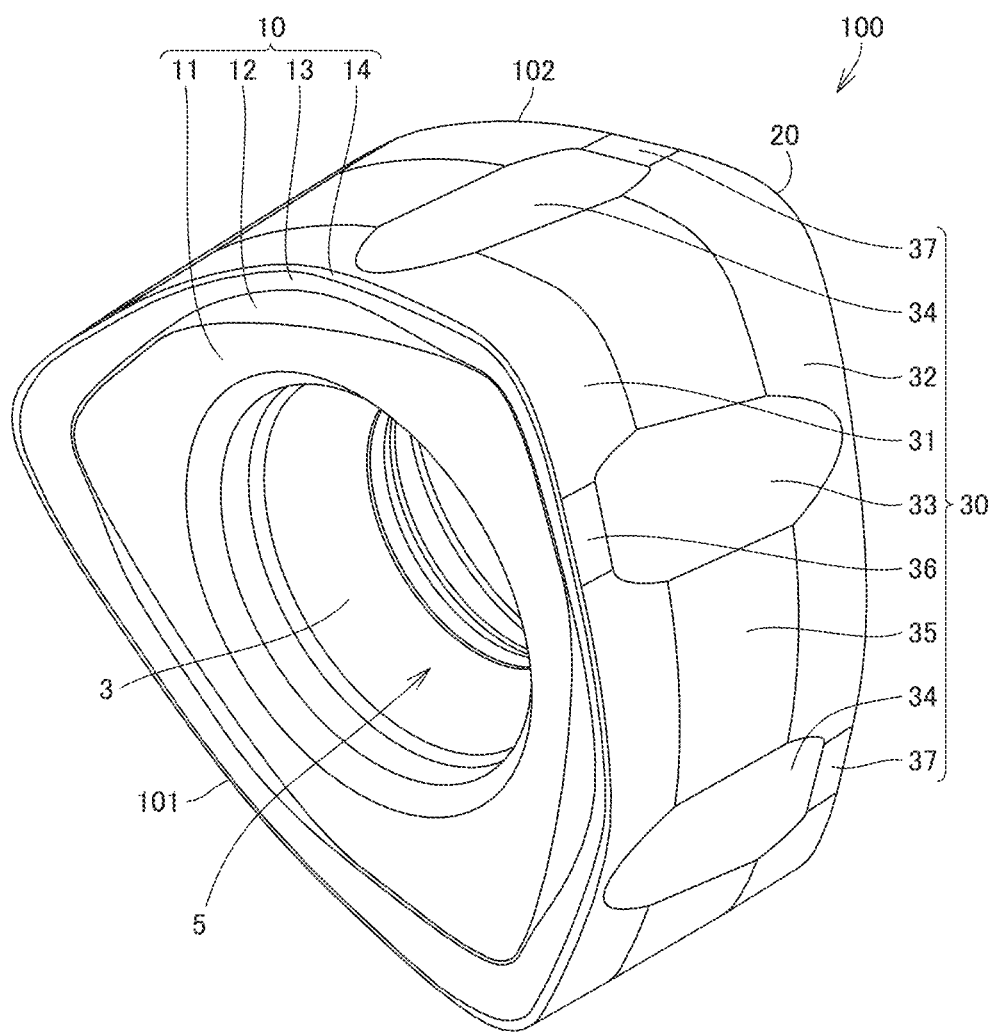
FIG. 1 is a schematic perspective view showing a configuration of a cutting insert for a rotary cutting tool in accordance with a first embodiment.

Problem to be Solved by the Present Disclosure

An object of the present disclosure is to provide a cutting insert for a rotary cutting tool and a rotary cutting tool that can have an extended life.

Advantageous Effect of the Present Disclosure

According to the present disclosure, a cutting insert for a rotary cutting tool and a rotary cutting tool that can have an extended life can be provided.

Description of Embodiments of the Present Disclosure

First, embodiments of the present disclosure will be described in list form.

(1) A cutting insert 100 for a rotary cutting tool in accordance with the present disclosure includes a first surface 10, a second surface 20, and an outer circumferential surface 30. Second surface 20 is opposite to first surface 10. Outer circumferential surface 30 is contiguous to each of first surface 10 and second surface 20. A ridgeline between first surface 10 and outer circumferential surface 30 includes a first cutting edge 1. A ridgeline between second surface 20 and outer circumferential surface 30 includes a second cutting edge 2. First surface 10 includes a first seating surface 11 having a shape of a flat surface. Second surface 20 includes a second seating surface 21 having a shape of a flat surface. First cutting edge 1 has a first main cutting edge portion 51 and a first sub cutting edge portion 52. Second cutting edge 2 has a second main cutting edge portion 61 and a second sub cutting edge portion 62. When viewed in a direction from first surface 10 toward second surface 20, at least a portion of second sub cutting edge portion 62 is located outside first main cutting edge portion 51, and at least a portion of first sub cutting edge portion 52 is located outside second main cutting edge portion 61. When viewed in the direction from first surface 10 toward second surface 20, each of first sub cutting edge portion 52 and second sub cutting edge portion 62 has a shape of a curved line. Outer circumferential surface 30 includes a third seating surface 33 having a shape of a flat surface.

(2) According to cutting insert 100 for the rotary cutting tool in accordance with (1) described above, in a cross section which is parallel to the direction from first surface 10 toward second surface 20 and which intersects first main cutting edge portion 51, third seating surface 33, and second sub cutting edge portion 62, an angle formed between third seating surface 33 and first seating surface 11 may be an obtuse angle, and an angle formed between third seating surface 33 and second seating surface 21 may be an acute angle.

(3) According to cutting insert 100 for the rotary cutting tool in accordance with (2) described above, in the cross section which is parallel to the direction from first surface 10 toward second surface 20 and which intersects first main cutting edge portion 51, third seating surface 33, and second sub cutting edge portion 62, the angle formed between third seating surface 33 and first seating surface 11 may be 91° or more and 95° or less.

(4) According to cutting insert 100 for the rotary cutting tool in accordance with any of (1) to (3) described above, when viewed in the direction from first surface 10 toward second surface 20, the ridgeline between first surface 10 and outer circumferential surface 30 may have a shape with a rotational symmetry of 120° about a central axis A.

(5) According to cutting insert 100 for the rotary cutting tool in accordance with (4) described above, outer circumferential surface 30 may include a flank face 36 located between first main cutting edge portion 51 and third seating surface 33. Flank face 36 may be inclined relative to third seating surface 33.

(6) According to cutting insert 100 for the rotary cutting tool in accordance with any of (1) to (3) described above, when viewed in the direction from first surface 10 toward second surface 20, the ridgeline between first surface 10 and outer circumferential surface 30 may have a shape with a rotational symmetry of 180° about central axis A.

(7) According to cutting insert 100 for the rotary cutting tool in accordance with any of (1) to (6) described above, first main cutting edge portion 51 may include a first portion 71, a second portion 72 which is contiguous to first portion 71, and a third portion 73 which is spaced from first portion 71 and is contiguous to second portion 72. Second main cutting edge portion 61 may include a fourth portion 74, a fifth portion 75 which is contiguous to fourth portion 74, and a sixth portion 76 which is spaced from fourth portion 74 and is contiguous to fifth portion 75. Each of first portion 71, third portion 73, fourth portion 74, and sixth portion 76 may have a shape of a curved line.

(8) According to cutting insert 100 for the rotary cutting tool in accordance with (7) described above, each of second portion 72 and fifth portion 75 may have a shape of a straight line.

(9) According to cutting insert 100 for the rotary cutting tool in accordance with (7) described above, each of second portion 72 and fifth portion 75 may have a shape of a curved line.

(10) Cutting insert 100 for the rotary cutting tool in accordance with the present disclosure includes first surface 10, second surface 20, and outer circumferential surface 30. Second surface 20 is opposite to first surface 10. Outer circumferential surface 30 is contiguous to each of first surface 10 and second surface 20. A ridgeline between first surface 10 and outer circumferential surface 30 includes first cutting edge 1. A ridgeline between second surface 20 and outer circumferential surface 30 includes second cutting edge 2. First surface 10 includes first seating surface 11 having a shape of a flat surface. Second surface 20 includes second seating surface 21 having a shape of a flat surface. First cutting edge 1 has first main cutting edge portion 51 and first sub cutting edge portion 52. Second cutting edge 2 has second main cutting edge portion 61 and second sub cutting edge portion 62. When viewed in a direction from first surface 10 toward second surface 20, at least a portion of second sub cutting edge portion 62 is located outside first main cutting edge portion 51, and at least a portion of first sub cutting edge portion 52 is located outside second main cutting edge portion 61. When viewed in the direction from first surface 10 toward second surface 20, each of first sub cutting edge portion 52 and second sub cutting edge portion 62 has a shape of a curved line. Outer circumferential surface 30 includes third seating surface 33 having a shape of a flat surface. In a cross section which is parallel to the direction from first surface 10 toward second surface 20 and which intersects first main cutting edge portion 51, third seating surface 33, and second sub cutting edge portion 62, an angle formed between third seating surface 33 and first seating surface 11 is an obtuse angle, and an angle formed between third seating surface 33 and second seating surface 21 is an acute angle. When viewed in the direction from first surface 10 toward second surface 20, the ridgeline between first surface 10 and outer circumferential surface 30 has a shape with a rotational symmetry of 120° about central axis A.

(11) Cutting insert 100 for the rotary cutting tool in accordance with the present disclosure includes first surface 10, second surface 20, and outer circumferential surface 30. Second surface 20 is opposite to first surface 10. Outer circumferential surface 30 is contiguous to each of first surface 10 and second surface 20. A ridgeline between first surface 10 and outer circumferential surface 30 includes first cutting edge 1. A ridgeline between second surface 20 and outer circumferential surface 30 includes second cutting edge 2. First surface 10 includes first seating surface 11 having a shape of a flat surface. Second surface 20 includes second seating surface 21 having a shape of a flat surface. First cutting edge 1 has first main cutting edge portion 51 and first sub cutting edge portion 52. Second cutting edge 2 has second main cutting edge portion 61 and second sub cutting edge portion 62. When viewed in a direction from first surface 10 toward second surface 20, at least a portion of second sub cutting edge portion 62 is located outside first main cutting edge portion 51, and at least a portion of first sub cutting edge portion 52 is located outside second main cutting edge portion 61. When viewed in the direction from first surface 10 toward second surface 20, each of first sub cutting edge portion 52 and second sub cutting edge portion 62 has a shape of a curved line. Outer circumferential surface 30 includes third seating surface 33 having a shape of a flat surface. In a cross section which is parallel to the direction from first surface 10 toward second surface 20 and which intersects first main cutting edge portion 51, third seating surface 33, and second sub cutting edge portion 62, an angle formed between third seating surface 33 and first seating surface 11 is an obtuse angle, and an angle formed between third seating surface 33 and second seating surface 21 is an acute angle. When viewed in the direction from first surface 10 toward second surface 20, the ridgeline between first surface 10 and outer circumferential surface 30 has a shape with a rotational symmetry of 180° about central axis A.

(12) A rotary cutting tool 90 in accordance with the present disclosure includes cutting insert 100 for the rotary cutting tool according to any of (1) to (11) described above, and a main body portion that holds cutting insert 100 for the rotary cutting tool.

Details of Embodiments of the Present Disclosure

Next, details of the embodiments of the present disclosure will be described with reference to the drawings. In the drawings below, identical or corresponding parts will be designated by the same reference numerals, and redundant description will not be repeated.

First Embodiment

First, a configuration of cutting insert 100 for a rotary cutting tool in accordance with a first embodiment of the present disclosure will be described.

FIG. 1 is a schematic perspective view showing a configuration of cutting insert 100 for the rotary cutting tool in accordance with the first embodiment. As shown in FIG. 1, cutting insert 100 for the rotary cutting tool in accordance with the first embodiment mainly has first surface 10, second surface 20, outer circumferential surface 30, and an inner circumferential surface 3. Second surface 20 is opposite to first surface 10. Outer circumferential surface 30 is contiguous to each of first surface 10 and second surface 20. Similarly, inner circumferential surface 3 is contiguous to each of first surface 10 and second surface 20. Outer circumferential surface 30 is outside inner circumferential surface 3. Inner circumferential surface 3 constitutes a through hole 5.

Figure 2:
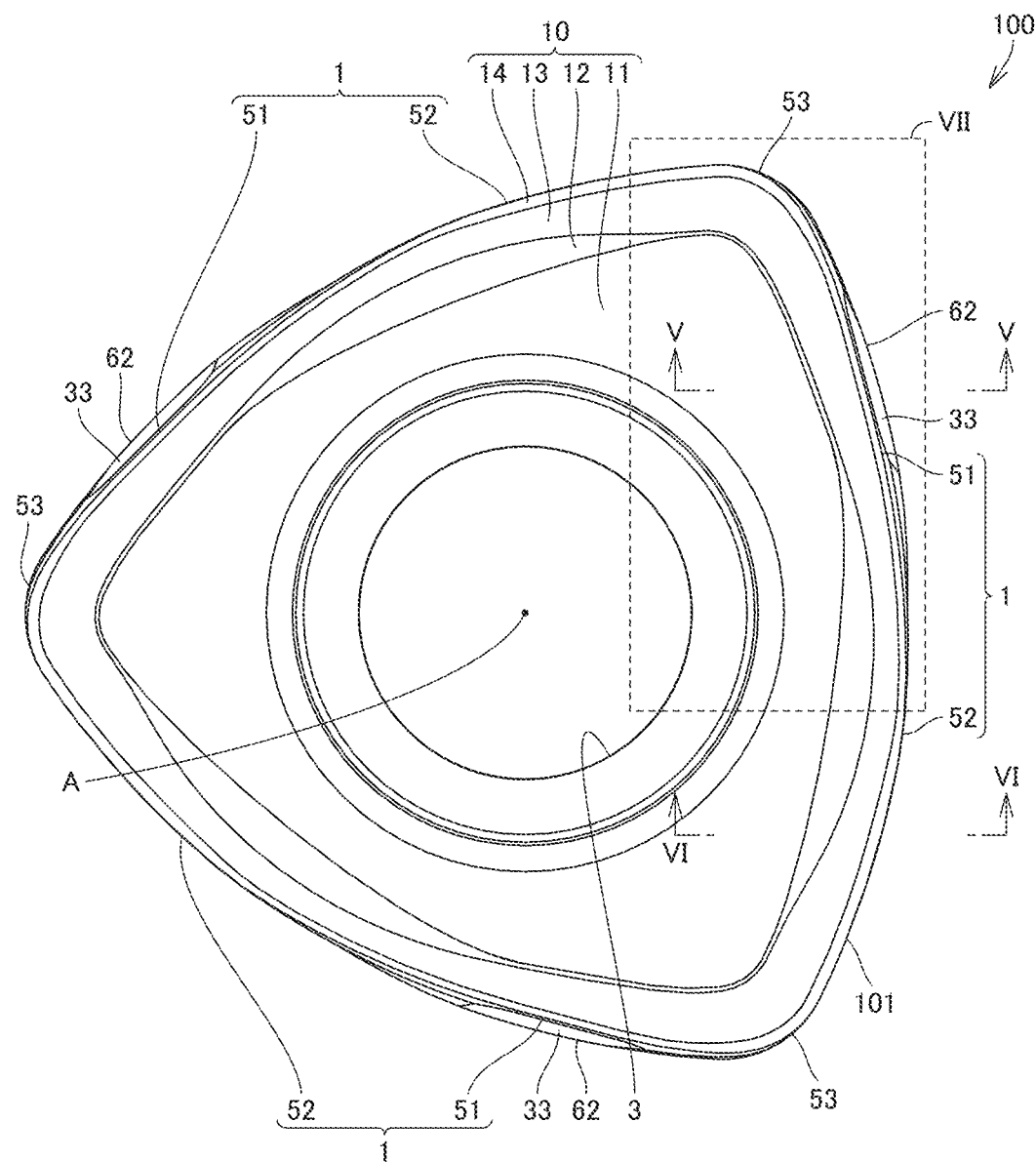
FIG. 2 is a schematic plan view showing the configuration of the cutting insert for the rotary cutting tool in accordance with the first embodiment.

FIG. 2 is a schematic plan view showing the configuration of cutting insert 100 for the rotary cutting tool in accordance with the first embodiment. As shown in FIG. 2, first surface 10 includes first seating surface 11, a first bottom surface 12, a first inclined surface 13, and a first land surface 14. First seating surface 11 has a shape of a flat surface. First seating surface 11 may be contiguous to inner circumferential surface 3. As shown in FIG. 2, when viewed in a direction from first surface 10 toward second surface 20, first seating surface 11 has an annular shape. First bottom surface 12 is contiguous to first seating surface 11. First bottom surface 12 is located outside first seating surface 11. First bottom surface 12 has an annular shape, for example. First bottom surface 12 may surround first seating surface 11.

As shown in FIG. 2, first inclined surface 13 is contiguous to first bottom surface 12. First inclined surface 13 is located outside first bottom surface 12. First inclined surface 13 has an annular shape, for example. First inclined surface 13 may surround first bottom surface 12. First land surface 14 is contiguous to first inclined surface 13. First land surface 14 is located outside first inclined surface 13. First land surface 14 has an annular shape, for example. First land surface 14 may surround first inclined surface 13. First land surface 14 is contiguous to outer circumferential surface 30. A ridgeline between first land surface 14 and outer circumferential surface 30 includes first cutting edge 1.

As shown in FIG. 2, a ridgeline between first surface 10 and outer circumferential surface 30 (a first ridgeline 101) includes first cutting edge 1. First cutting edge 1 has an annular shape. First cutting edge 1 includes first main cutting edge portion 51 and first sub cutting edge portion 52. In a circumferential direction, first main cutting edge portion 51 and first sub cutting edge portion 52 are alternately located. In cutting insert 100 in the first embodiment, first cutting edge 1 has three first main cutting edge portions 51 and three first sub cutting edge portions 52. When viewed in the direction from first surface 10 toward second surface 20, first sub cutting edge portion 52 has a shape of a curved line. First sub cutting edge portion 52 has an arc shape, for example. When viewed from inner circumferential surface 3, first sub cutting edge portion 52 has a shape protruding outward.

As shown in FIG. 2, first ridgeline 101 is substantially a triangle. From another viewpoint, first ridgeline 101 has three first corner portions 53. First corner portion 53 is located between first main cutting edge portion 51 and first sub cutting edge portion 52, for example. First corner portion 53 may function as a cutting edge. When viewed in the direction from first surface 10 toward second surface 20, first ridgeline 101 has a shape with a rotational symmetry of 120° about central axis A. From another viewpoint, the shape obtained by rotating first ridgeline 101 by 120° about central axis A matches the shape of first ridgeline 101. It should be noted that central axis A is a straight line which passes through the center of through hole 5 and is perpendicular to first seating surface 11.

Figure 3:
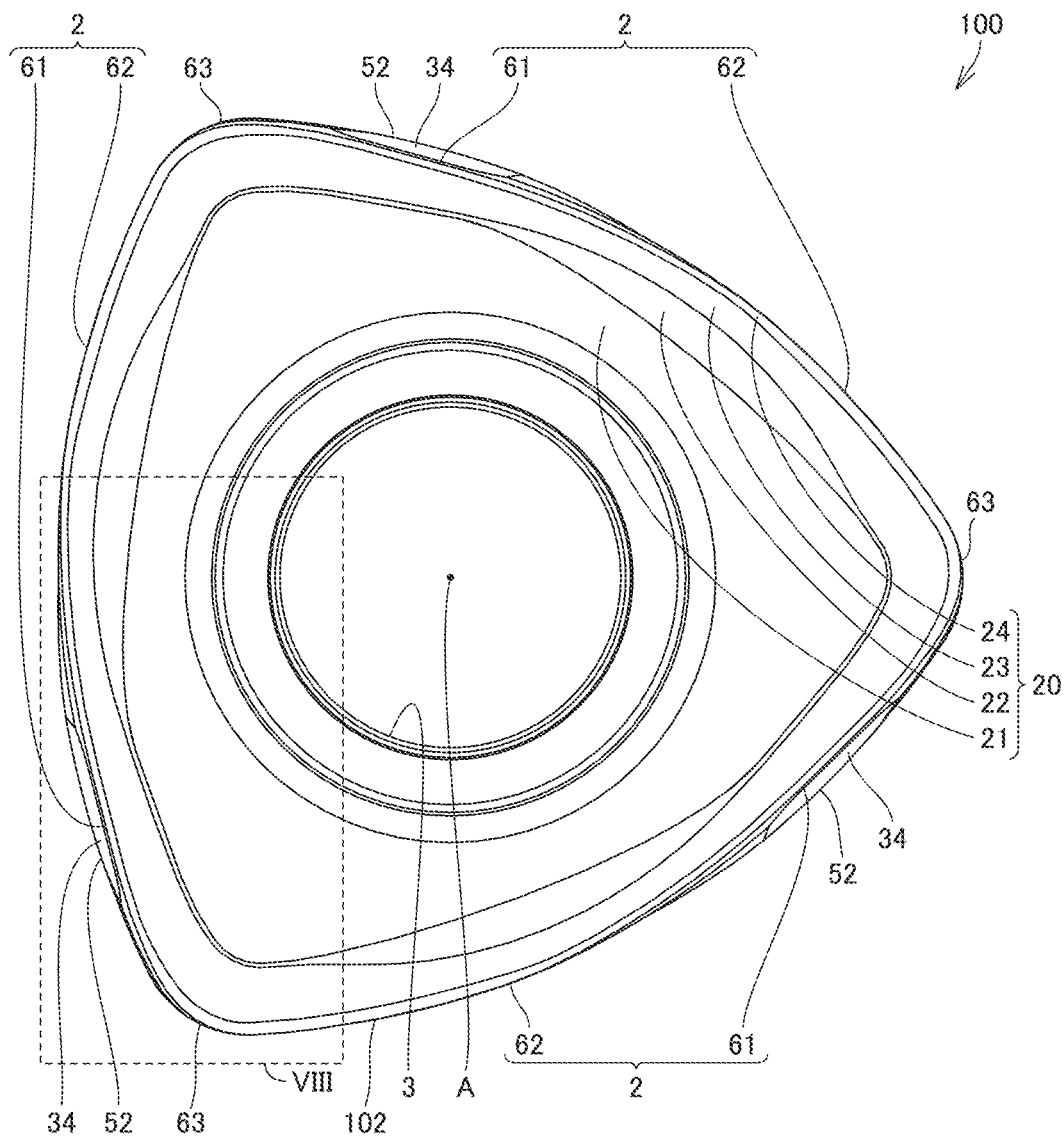
FIG. 3 is a schematic rear view showing the configuration of the cutting insert for the rotary cutting tool in accordance with the first embodiment.

FIG. 3 is a schematic rear view showing the configuration of cutting insert 100 for the rotary cutting tool in accordance with the first embodiment. As shown in FIG. 3, second surface 20 includes second seating surface 21, a second bottom surface 22, a second inclined surface 23, and a second land surface 24. Second seating surface 21 has a shape of a flat surface. Second seating surface 21 may be contiguous to inner circumferential surface 3. As shown in FIG. 3, when viewed in a direction from second surface 20 toward first surface 10, second seating surface 21 has an annular shape. Second bottom surface 22 is contiguous to second seating surface 21. Second bottom surface 22 is located outside second seating surface 21. Second bottom surface 22 has an annular shape, for example. Second bottom surface 22 may surround second seating surface 21.

As shown in FIG. 3, second inclined surface 23 is contiguous to second bottom surface 22. Second inclined surface 23 is located outside second bottom surface 22. Second inclined surface 23 has an annular shape, for example. Second inclined surface 23 may surround second bottom surface 22. Second land surface 24 is contiguous to second inclined surface 23. Second land surface 24 is located outside second inclined surface 23. Second land surface 24 has an annular shape, for example. Second land surface 24 may surround second inclined surface 23. Second land surface 24 is contiguous to outer circumferential surface 30. A ridgeline between second land surface 24 and outer circumferential surface 30 includes second cutting edge 2.

As shown in FIG. 3, a ridgeline between second surface 20 and outer circumferential surface 30 (a second ridgeline 102) includes second cutting edge 2. Second cutting edge 2 has an annular shape. Second cutting edge 2 includes second main cutting edge portion 61 and second sub cutting edge portion 62. In the circumferential direction, second main cutting edge portion 61 and second sub cutting edge portion 62 are alternately located. In cutting insert 100 in the first embodiment, second cutting edge 2 has three second main cutting edge portions 61 and three second sub cutting edge portions 62. When viewed in the direction from first surface 10 toward second surface 20, second sub cutting edge portion 62 has a shape of a curved line. Second sub cutting edge portion 62 has an arc shape, for example. When viewed from central axis A, second sub cutting edge portion 62 has a shape protruding outward.

As shown in FIG. 3, second ridgeline 102 is substantially a triangle. From another viewpoint, second ridgeline 102 has three second corner portions 63. Second corner portion 63 is located between second main cutting edge portion 61 and second sub cutting edge portion 62, for example. Second corner portion 63 may function as a cutting edge. When viewed in the direction from second surface 20 toward first surface 10, second ridgeline 102 has a shape with a rotational symmetry of 120° about central axis A. From another viewpoint, the shape obtained by rotating second ridgeline 102 by 120° about central axis A matches the shape of second ridgeline 102. It should be noted that central axis A is a straight line which passes through the center of through hole 5 and is perpendicular to second seating surface 21.

Figure 4:
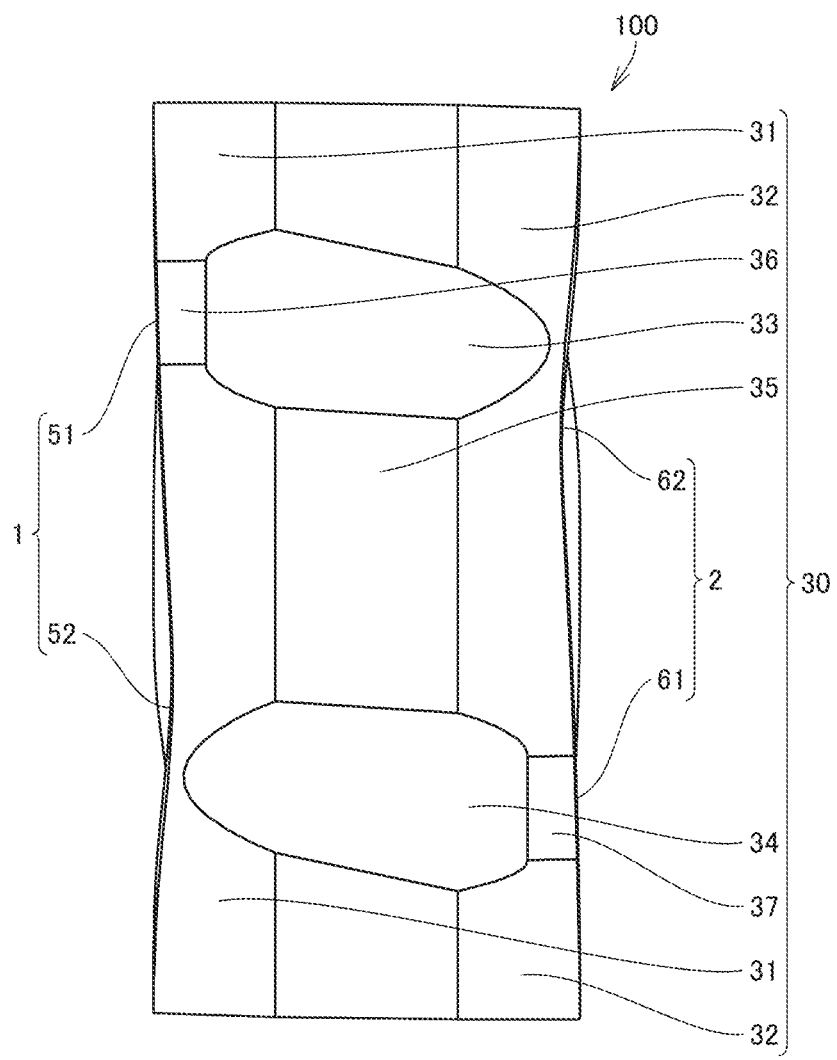
FIG. 4 is a schematic side view showing the configuration of the cutting insert for the rotary cutting tool in accordance with the first embodiment.

FIG. 4 is a schematic side view showing the configuration of cutting insert 100 for the rotary cutting tool in accordance with the first embodiment. As shown in FIG. 4, outer circumferential surface 30 mainly has third seating surface 33, a fourth seating surface 34, a first flank face 36, a second flank face 37, a first outer circumferential surface portion 31, a second outer circumferential surface portion 32, and a third outer circumferential surface portion 35.

Third seating surface 33 has a shape of a flat surface. Third seating surface 33 is located between first main cutting edge portion 51 and second sub cutting edge portion 62. Third seating surface 33 is spaced from each of first main cutting edge portion 51 and second sub cutting edge portion 62. First flank face 36 is located between first main cutting edge portion 51 and third seating surface 33. First flank face 36 is contiguous to each of first main cutting edge portion 51 and third seating surface 33. First flank face 36 may have a shape of a flat surface. First flank face 36 may be inclined toward through hole 5 relative to third seating surface 33. An inclination angle of first flank face 36 relative to third seating surface 33 is 1° or more and 3° or less, for example.

Fourth seating surface 34 has a shape of a flat surface. Fourth seating surface 34 is located between second main cutting edge portion 61 and first sub cutting edge portion 52. Fourth seating surface 34 is spaced from each of second main cutting edge portion 61 and first sub cutting edge portion 52. Second flank face 37 is located between second main cutting edge portion 61 and fourth seating surface 34. Second flank face 37 is contiguous to each of second main cutting edge portion 61 and fourth seating surface 34. Second flank face 37 may have a shape of a flat surface. Second flank face 37 may be inclined toward through hole 5 relative to fourth seating surface 34. An inclination angle of second flank face 37 relative to fourth seating surface 34 is 1° or more and 3° or less, for example.

As shown in FIG. 4, first outer circumferential surface portion 31 is contiguous to first cutting edge 1. Second outer circumferential surface portion 32 is contiguous to second cutting edge 2. Third outer circumferential surface portion 35 is located between first outer circumferential surface portion 31 and second outer circumferential surface portion 32. Third outer circumferential surface portion 35 is contiguous to each of first outer circumferential surface portion 31 and second outer circumferential surface portion 32. As shown in FIG. 4, first outer circumferential surface portion 31 may be contiguous to each of third seating surface 33 and fourth seating surface 34. First outer circumferential surface portion 31 may be contiguous to first flank face 36. Second outer circumferential surface portion 32 may be contiguous to each of third seating surface 33 and fourth seating surface 34. Second outer circumferential surface portion 32 may be contiguous to second flank face 37.

As shown in FIG. 4, in the circumferential direction, third outer circumferential surface portion 35 may be located between third seating surface 33 and fourth seating surface 34. Third outer circumferential surface portion 35 may be contiguous to each of third seating surface 33 and fourth seating surface 34. Each of first outer circumferential surface portion 31, second outer circumferential surface portion 32, and third outer circumferential surface portion 35 has a shape of a curved surface, for example. When viewed from central axis A, each of first outer circumferential surface portion 31, second outer circumferential surface portion 32, and third outer circumferential surface portion 35 may be a curved surface protruding outward, for example.

Figure 5:
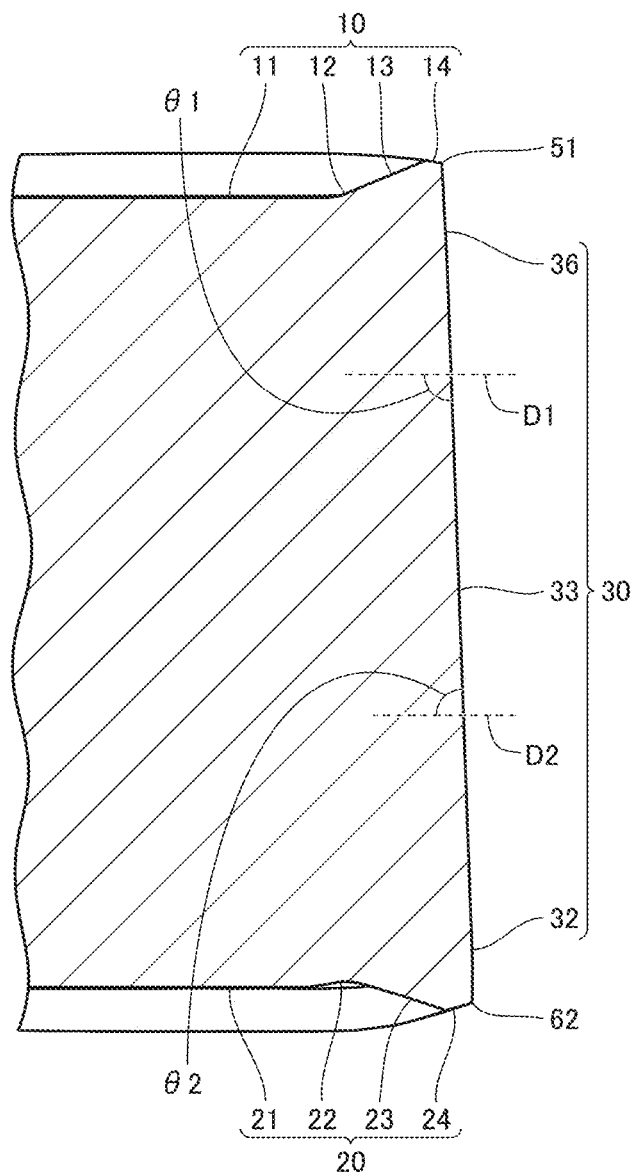
FIG. 5 is a schematic cross sectional view taken along a line V-V in FIG. 2.

FIG. 5 is a schematic cross sectional view taken along a line V-V in FIG. 2.

The cross section shown in FIG. 5 is a cross section which is parallel to the direction from first surface 10 toward second surface 20 and which intersects first main cutting edge portion 51, third seating surface 33, and second sub cutting edge portion 62 (a first cross section). As shown in FIG. 5, in the first cross section, an angle formed between third seating surface 33 and first seating surface 11 (a first angle $\theta1$) may be an obtuse angle, and an angle formed between third seating surface 33 and second seating surface 21 (a second angle $\theta2$) may be an acute angle. The angle formed between third seating surface 33 and first seating surface 11 (first angle $\theta1$) is an angle formed between third seating surface 33 and a first straight line D1 parallel to first seating surface 11. The angle formed between third seating surface 33 and second seating surface 21 (second angle $\theta2$) is an angle formed between third seating surface 33 and a second straight line D2 parallel to second seating surface 21.

First angle $\theta1$ is 91° or more and 95° or less, for example. The lower limit of first angle $\theta1$ is not particularly limited, and may be 91.5° or more, or 92° or more, for example. The upper limit of first angle $\theta1$ is not particularly limited, and may be 94.5° or less, or 94° or less, for example.

Second angle $\theta2$ is 85° or more and 89° or less, for example. The lower limit of second angle $\theta2$ is not particularly limited, and may be 85.5° or more, or 86° or more, for example. The upper limit of second angle $\theta2$ is not particularly limited, and may be 88.5° or less, or 88° or less, for example.

As shown in FIG. 5, in the first cross section, first land surface 14 is inclined relative to first flank face 36. First inclined surface 13 is inclined relative to first land surface 14. First inclined surface 13 is inclined relative to first seating surface 11. First inclined surface 13 is inclined upward relative to first seating surface 11. It should be noted that upward is a direction from second seating surface 21 toward first seating surface 11. First land surface 14 is inclined downward relative to first inclined surface 13. It should be noted that downward is a direction from first seating surface 11 toward second seating surface 21.

As shown in FIG. 5, in the first cross section, second land surface 24 is inclined relative to second outer circumferential surface portion 32. Second inclined surface 23 is inclined relative to second land surface 24. Second inclined surface 23 is inclined relative to second seating surface 21. Second inclined surface 23 is inclined downward relative to second seating surface 21. Second land surface 24 is inclined upward relative to second inclined surface 23. In the direction from second seating surface 21 toward first seating surface 11, second seating surface 21 is located between second bottom surface 22 and second land surface 24.

Figure 6:
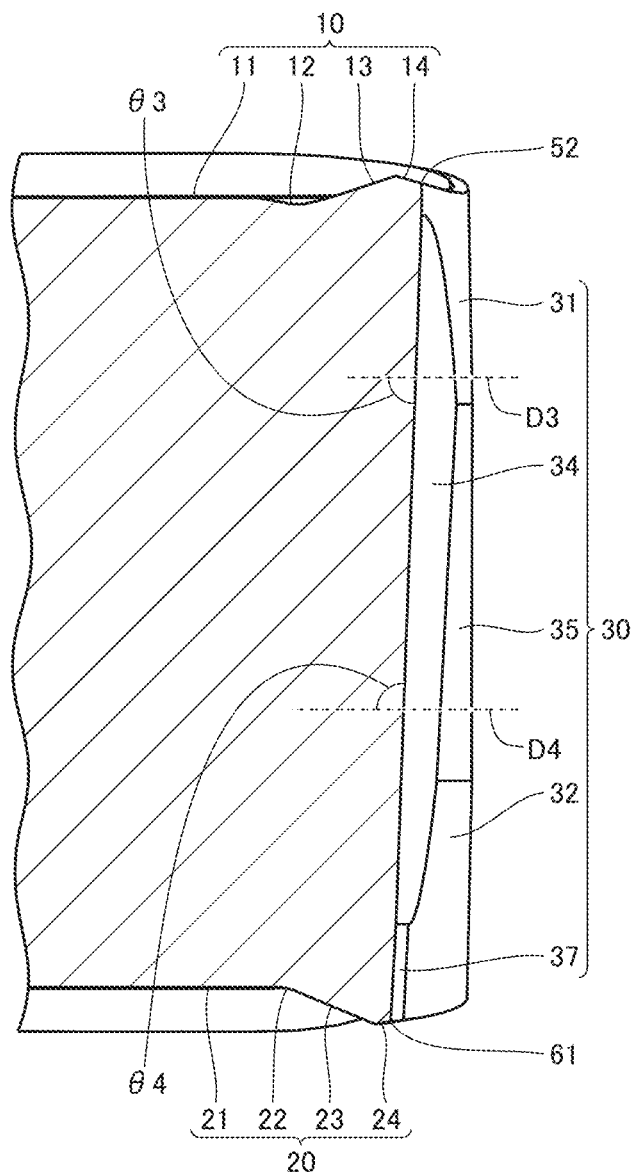
FIG. 6 is a schematic cross sectional view taken along a line VI-VI in FIG. 2.

FIG. 6 is a schematic cross sectional view taken along a line VI-VI in FIG. 2. The cross section shown in FIG. 6 is a cross section which is parallel to the direction from first surface 10 toward second surface 20 and which intersects second main cutting edge portion 61, fourth seating surface 34, and first sub cutting edge portion 52 (a second cross section). As shown in FIG. 6, in the second cross section, an angle formed between fourth seating surface 34 and first seating surface 11 (a third angle $\theta3$) may be an acute angle, and an angle formed between fourth seating surface 34 and second seating surface 21 (a fourth angle $\theta4$) may be an obtuse angle. The angle formed between fourth seating surface 34 and first seating surface 11 (third angle $\theta3$) is an angle formed between fourth seating surface 34 and a third straight line D3 parallel to first seating surface 11. The angle formed between fourth seating surface 34 and second seating surface 21 (fourth angle $\theta4$) is an angle formed between fourth seating surface 34 and a fourth straight line D4 parallel to second seating surface 21.

Third angle $\theta3$ is 85° or more and 89° or less, for example. The lower limit of third angle $\theta3$ is not particularly limited, and may be 85.5° or more, or 86° or more, for example. The upper limit of third angle $\theta3$ is not particularly limited, and may be 88.5° or less, or 88° or less, for example.

Fourth angle $\theta4$ is 91° or more and 95° or less, for example. The lower limit of fourth angle $\theta4$ is not particularly limited, and may be 91.5° or more, or 92° or more, for example. The upper limit of fourth angle $\theta4$ is not particularly limited, and may be 94.5° or less, or 94° or less, for example.

As shown in FIG. 6, in the second cross section, first land surface 14 is inclined relative to first outer circumferential surface portion 31. First inclined surface 13 is inclined relative to first land surface 14. First inclined surface 13 is inclined relative to first seating surface 11. First inclined surface 13 is inclined upward relative to first seating surface 11. First land surface 14 is inclined downward relative to first inclined surface 13. In the direction from second seating surface 21 toward first seating surface 11, first seating surface 11 is located between first bottom surface 12 and first land surface 14.

As shown in FIG. 6, in the second cross section, second land surface 24 is inclined relative to second flank face 37. Second inclined surface 23 is inclined relative to second land surface 24. Second inclined surface 23 is inclined relative to second seating surface 21. Second inclined surface 23 is inclined downward relative to second seating surface 21. Second land surface 24 is inclined upward relative to second inclined surface 23.

Figure 7:
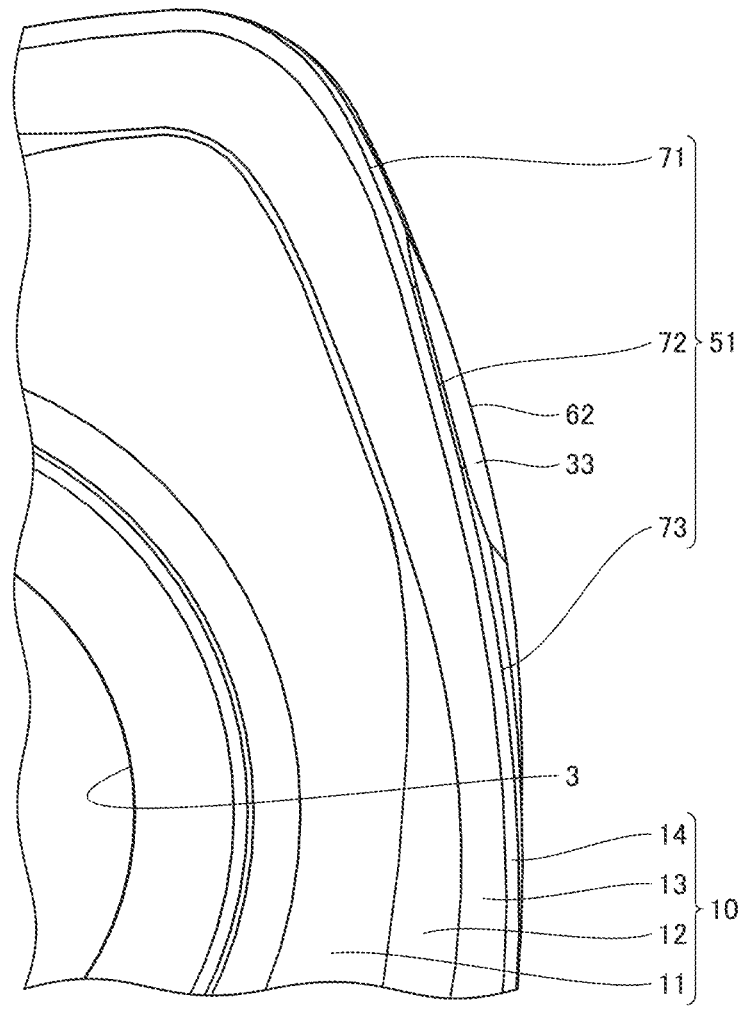
FIG. 7 is an enlarged view of a region VII in FIG. 2.

FIG. 7 is an enlarged view of a region VII in FIG. 2. As shown in FIG. 7, when viewed in the direction from first surface 10 toward second surface 20, at least a portion of second sub cutting edge portion 62 is located outside first main cutting edge portion 51. Second sub cutting edge portion 62 may be entirely located outside first main cutting edge portion 51. First main cutting edge portion 51 includes first portion 71, second portion 72, and third portion 73. Second portion 72 is contiguous to first portion 71. Third portion 73 is contiguous to second portion 72. Third portion 73 is spaced from first portion 71. Second portion 72 is located between first portion 71 and third portion 73. Second portion 72 is a ridgeline between first flank face 36 and first surface 10, for example.

As shown in FIG. 7, when viewed in the direction from first surface 10 toward second surface 20, each of first portion 71 and third portion 73 has a shape of a curved line, for example. Second portion 72 has a shape of a straight line, for example. Second portion 72 may have a shape of a curved line, for example. When viewed in the direction from first surface 10 toward second surface 20, at least a portion of second sub cutting edge portion 62 is located outside second portion 72 of first main cutting edge portion 51.

First portion 71 is smoothly contiguous to second portion 72. From another viewpoint, when viewed in the direction from first surface 10 toward second surface 20, inclination of a tangent to first portion 71 and inclination of a tangent to second portion 72 change continuously at a boundary between first portion 71 and second portion 72. Similarly, third portion 73 is smoothly contiguous to second portion 72. From another viewpoint, when viewed in the direction from first surface 10 toward second surface 20, inclination of a tangent to third portion 73 and the inclination of the tangent to second portion 72 change continuously at a boundary between third portion 73 and second portion 72.

Figure 8:
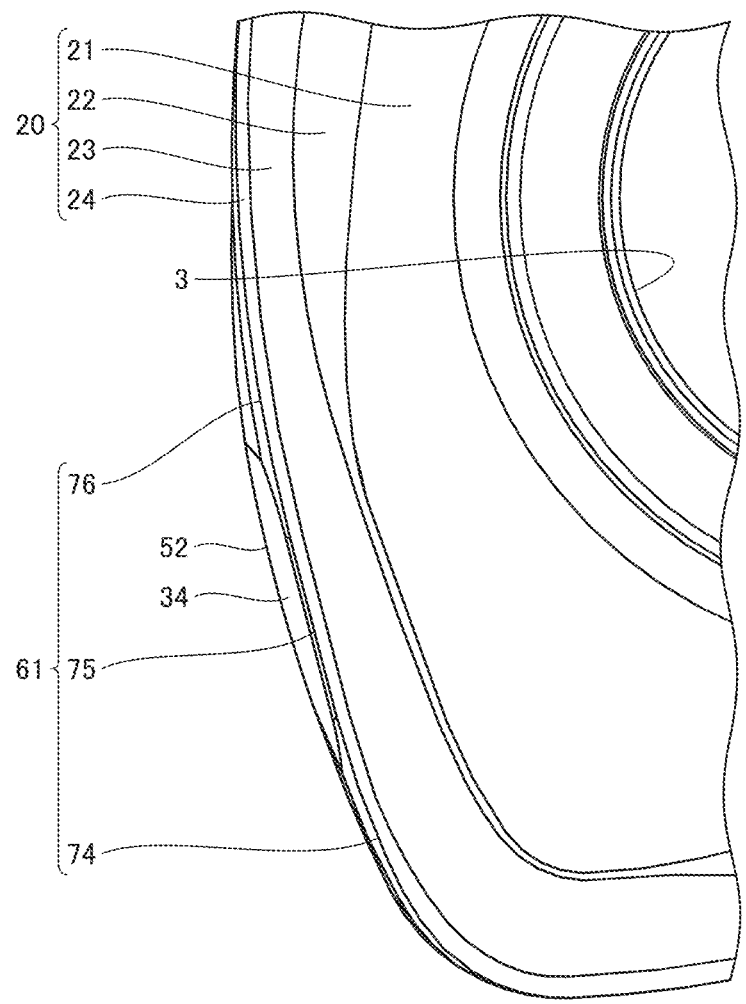
FIG. 8 is an enlarged view of a region VIII in FIG. 3.

FIG. 8 is an enlarged view of a region VIII in FIG. 3. As shown in FIG. 8, when viewed in the direction from second surface 20 toward first surface 10, at least a portion of first sub cutting edge portion 52 is located outside second main cutting edge portion 61. First sub cutting edge portion 52 may be entirely located outside second main cutting edge portion 61. Second main cutting edge portion 61 includes fourth portion 74, fifth portion 75, and sixth portion 76. Fifth portion 75 is contiguous to fourth portion 74. Sixth portion 76 is contiguous to fifth portion 75. Sixth portion 76 is spaced from fourth portion 74. Fifth portion 75 is located between fourth portion 74 and sixth portion 76. Fifth portion 75 is a ridgeline between second flank face 37 and second surface 20, for example.

As shown in FIG. 8, when viewed in the direction from second surface 20 toward first surface 10, each of fourth portion 74 and sixth portion 76 has a shape of a curved line, for example. Fifth portion 75 has a shape of a straight line, for example. Fifth portion 75 may have a shape of a curved line, for example. When viewed in the direction from second surface 20 toward first surface 10, at least a portion of first sub cutting edge portion 52 is located outside fifth portion 75 of second main cutting edge portion 61.

Fourth portion 74 is smoothly contiguous to fifth portion 75. From another viewpoint, when viewed in the direction from second surface 20 toward first surface 10, inclination of a tangent to fourth portion 74 and inclination of a tangent to fifth portion 75 change continuously at a boundary between fourth portion 74 and fifth portion 75. Similarly, sixth portion 76 is smoothly contiguous to fifth portion 75. From another viewpoint, when viewed in the direction from second surface 20 toward first surface 10, inclination of a tangent to sixth portion 76 and the inclination of the tangent to fifth portion 75 change continuously at a boundary between sixth portion 76 and fifth portion 75.

Second Embodiment

Next, a configuration of a rotary cutting tool in accordance with a second embodiment of the present disclosure will be described.

Figure 9:
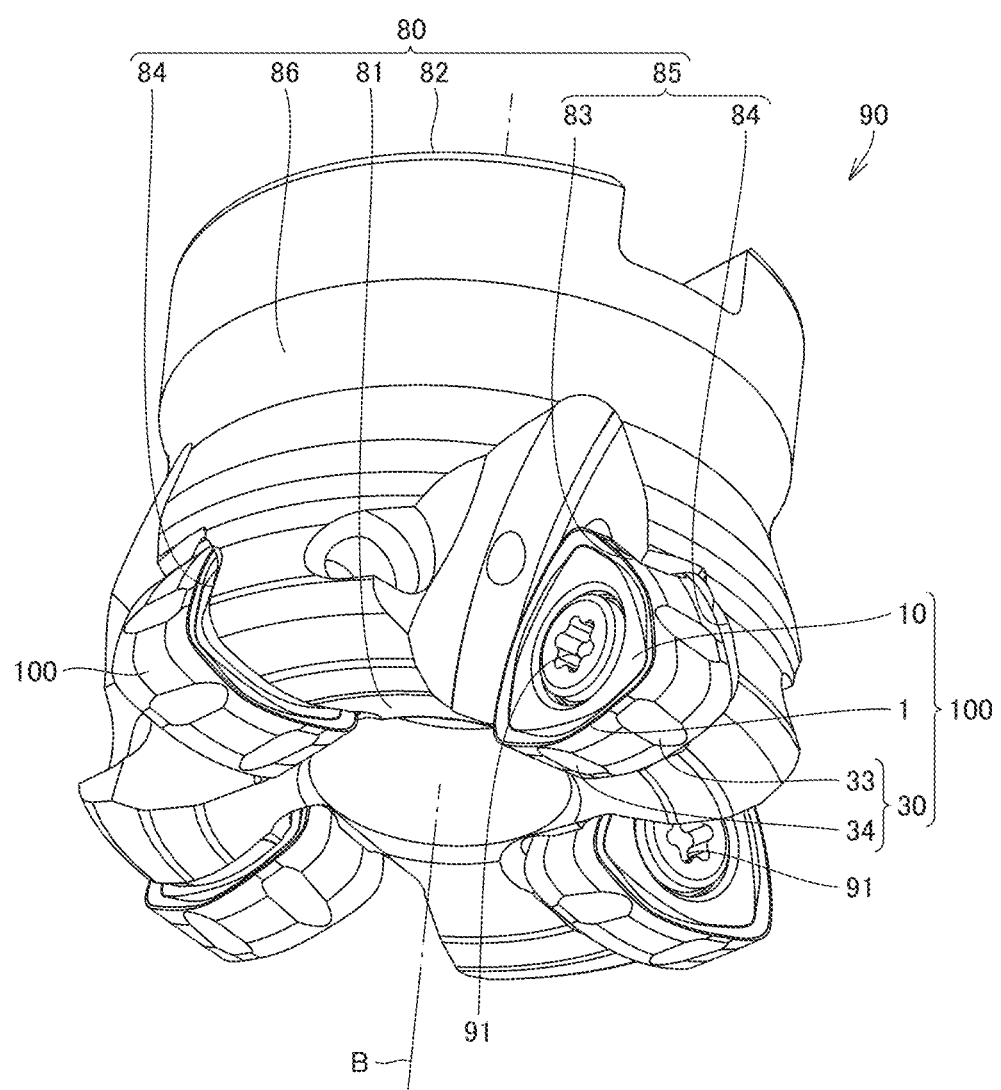
FIG. 9 is a schematic perspective view showing a configuration of a rotary cutting tool in accordance with a second embodiment.

FIG. 9 is a schematic perspective view showing a configuration of a rotary cutting tool in accordance with the second embodiment. As shown in FIG. 9, rotary cutting tool 90 in accordance with the second embodiment is a milling tool, for example. Rotary cutting tool 90 in accordance with the second embodiment has a main body portion 80, cutting insert 100, and an attachment screw 91. Rotary cutting tool 90 rotates about a rotation axis B. Main body portion 80 holds cutting insert 100. Cutting insert 100 is, for example, cutting insert 100 in accordance with the first embodiment. In rotary cutting tool 90 in accordance with the second embodiment, four cutting inserts 100 are placed around rotation axis B.

Main body portion 80 has a front end surface 81, a back end surface 82, and an outer circumferential side surface 86. Front end surface 81 is a portion which faces a workpiece. Back end surface 82 is located opposite to front end surface 81. Back end surface 82 is attached to a tool holder, for example. Outer circumferential side surface 86 is contiguous to each of front end surface 81 and back end surface 82.

An insert placement groove 85 is formed in main body portion 80. Insert placement groove 85 has a first side wall surface 83 and a second side wall surface 84. First side wall surface 83 is inclined relative to second side wall surface 84 to intersect second side wall surface 84 in a substantially perpendicular direction. First side wall surface 83 is contiguous to each of front end surface 81 and outer circumferential side surface 86. First side wall surface 83 is spaced from back end surface 82. Similarly, second side wall surface 84 is contiguous to each of front end surface 81 and outer circumferential side surface 86. Second side wall surface 84 is spaced from back end surface 82.

First side wall surface 83 is in contact with third seating surface 33 and fourth seating surface 34 of cutting insert 100. First side wall surface 83 may be in contact with two third seating surfaces 33 at positions having a rotational symmetry of 120° about central axis A of cutting insert 100. Second side wall surface 84 is in contact with second seating surface 21 of cutting insert 100. In cutting insert 100, attachment screw 91 is placed in through hole 5 of cutting insert 100. Cutting insert 100 is attached to main body portion 80 using attachment screw 91. Thereby, cutting insert 100 is fixed to main body portion 80.

Third Embodiment

Next, a configuration of cutting insert 100 for a rotary cutting tool in accordance with a third embodiment of the present disclosure will be described.

Figure 10:
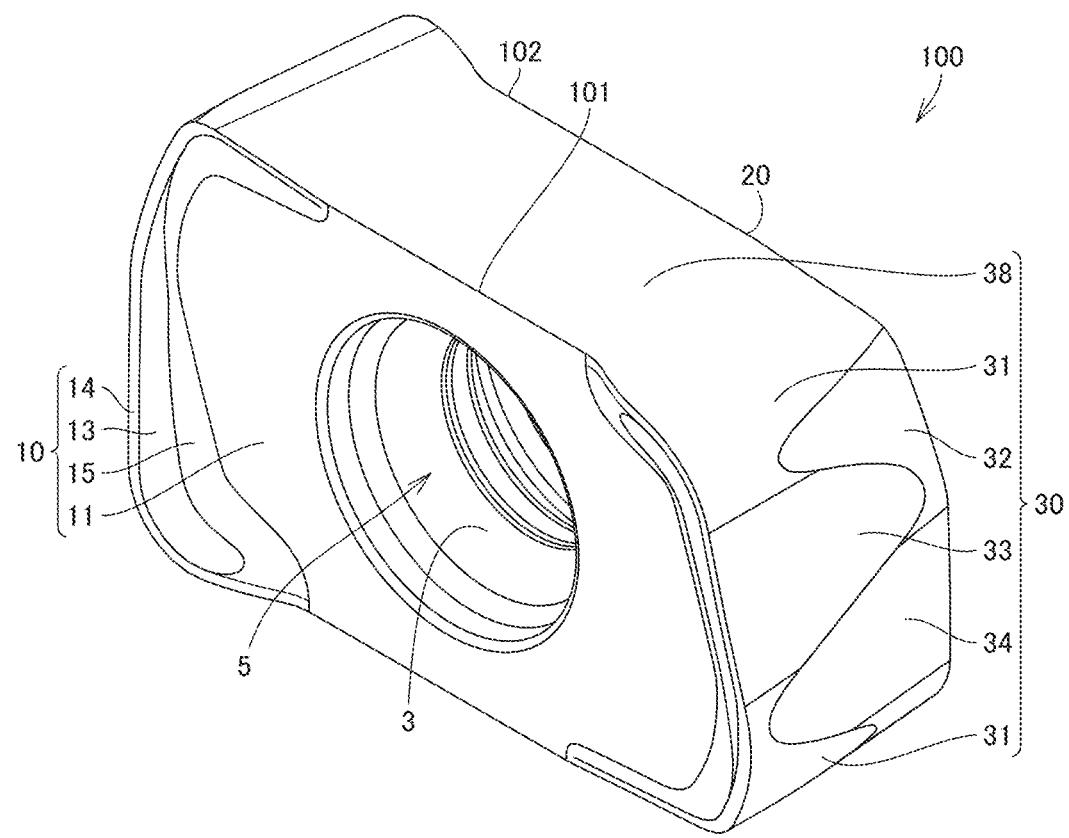
FIG. 10 is a schematic perspective view showing a configuration of a cutting insert for a rotary cutting tool in accordance with a third embodiment.

FIG. 10 is a schematic perspective view showing a configuration of cutting insert 100 for the rotary cutting tool in accordance with the third embodiment. As shown in FIG. 10, cutting insert 100 for the rotary cutting tool in accordance with the third embodiment mainly has first surface 10, second surface 20, outer circumferential surface 30, and inner circumferential surface 3. Second surface 20 is opposite to first surface 10. Outer circumferential surface 30 is contiguous to each of first surface 10 and second surface 20.

Similarly, inner circumferential surface 3 is contiguous to each of first surface 10 and second surface 20. Outer circumferential surface 30 is outside inner circumferential surface 3. Inner circumferential surface 3 constitutes through hole 5.

Figure 11:
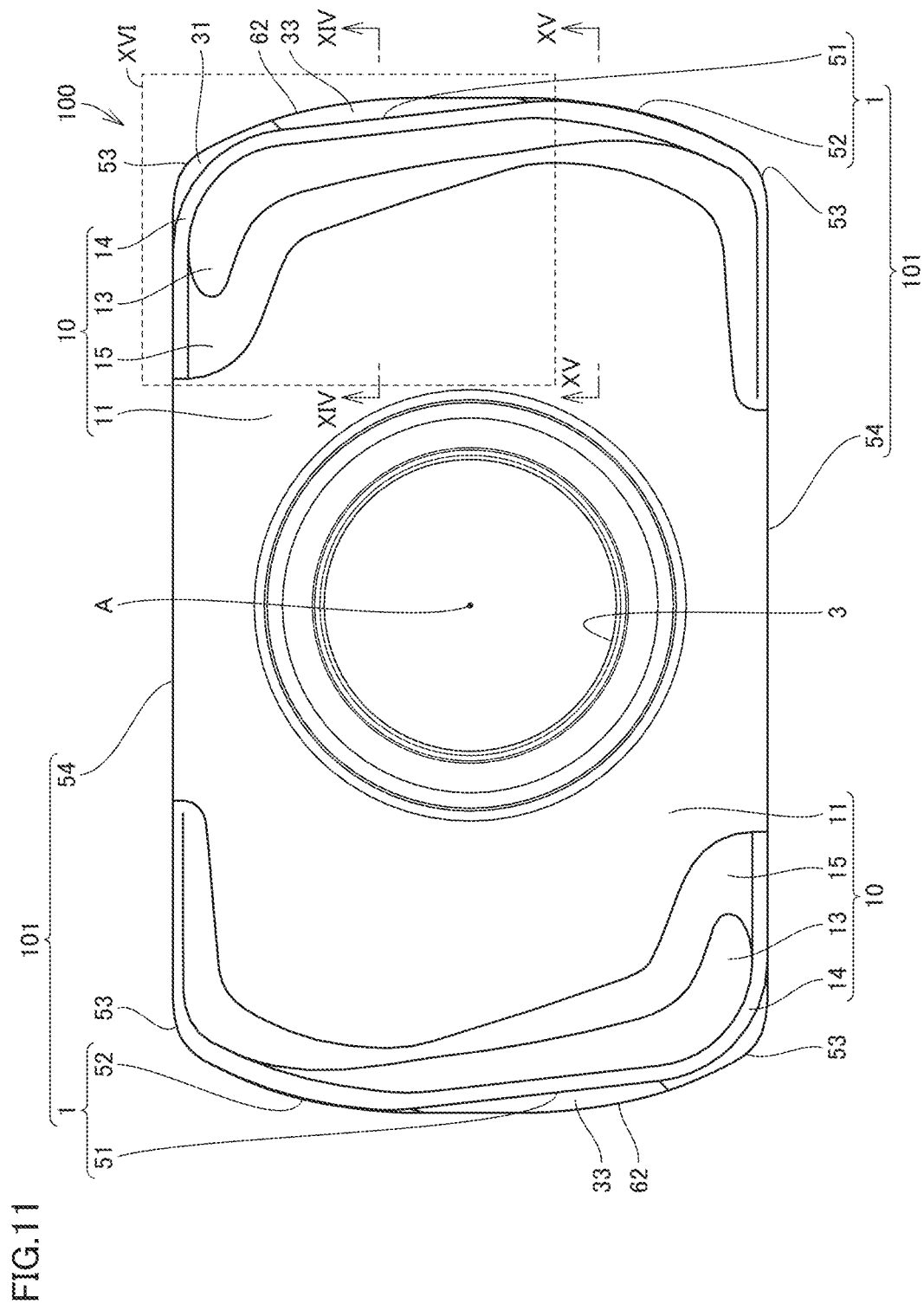
FIG. 11 is a schematic plan view showing the configuration of the cutting insert for the rotary cutting tool in accordance with the third embodiment.

FIG. 11 is a schematic plan view showing the configuration of cutting insert 100 for the rotary cutting tool in accordance with the third embodiment. As shown in FIG. 11, first surface 10 includes first seating surface 11, a third inclined surface 15, first inclined surface 13, and first land surface 14. First seating surface 11 has a shape of a flat surface. First seating surface 11 may be contiguous to inner circumferential surface 3. As shown in FIG. 11, when viewed in a direction from first surface 10 toward second surface 20, first seating surface 11 has an annular shape. Third inclined surface 15 is contiguous to first seating surface 11. Third inclined surface 15 is located outside first seating surface 11.

As shown in FIG. 11, first inclined surface 13 is contiguous to third inclined surface 15. First inclined surface 13 is located outside third inclined surface 15. First land surface 14 is contiguous to first inclined surface 13. First land surface 14 is located outside first inclined surface 13. First land surface 14 is contiguous to outer circumferential surface 30. A ridgeline between first land surface 14 and outer circumferential surface 30 constitutes first cutting edge 1. First seating surface 11 may be contiguous to outer circumferential surface 30. A ridgeline between first seating surface 11 and outer circumferential surface 30 constitutes a first straight line portion 54.

As shown in FIG. 11, a ridgeline between first surface 10 and outer circumferential surface 30 (first ridgeline 101) includes first cutting edge 1 and first straight line portion 54. First cutting edge 1 includes first main cutting edge portion 51 and first sub cutting edge portion 52. In a circumferential direction, first main cutting edge portion 51, first sub cutting edge portion 52, and first straight line portion 54 are alternately located. In cutting insert 100 in the third embodiment, first cutting edge 1 has two first main cutting edge portions 51 and two first sub cutting edge portions 52. When viewed in the direction from first surface 10 toward second surface 20, first sub cutting edge portion 52 has a shape of a curved line. First sub cutting edge portion 52 has an arc shape, for example. When viewed from inner circumferential surface 3, first sub cutting edge portion 52 has a shape protruding outward.

As shown in FIG. 11, the ridgeline between first surface 10 and outer circumferential surface 30 (first ridgeline 101) is substantially a rectangle. From another viewpoint, first ridgeline 101 has four first corner portions 53. First corner portion 53 is located between first main cutting edge portion 51 and first straight line portion 54, for example. When viewed in the direction from first surface 10 toward second surface 20, first ridgeline 101 has a shape with a rotational symmetry of 180° about central axis A. From another viewpoint, the shape obtained by rotating first ridgeline 101 by 180° about central axis A matches the shape of first ridgeline 101. It should be noted that central axis A is a straight line which passes through the center of through hole 5 and is perpendicular to first seating surface 11.

Figure 12:
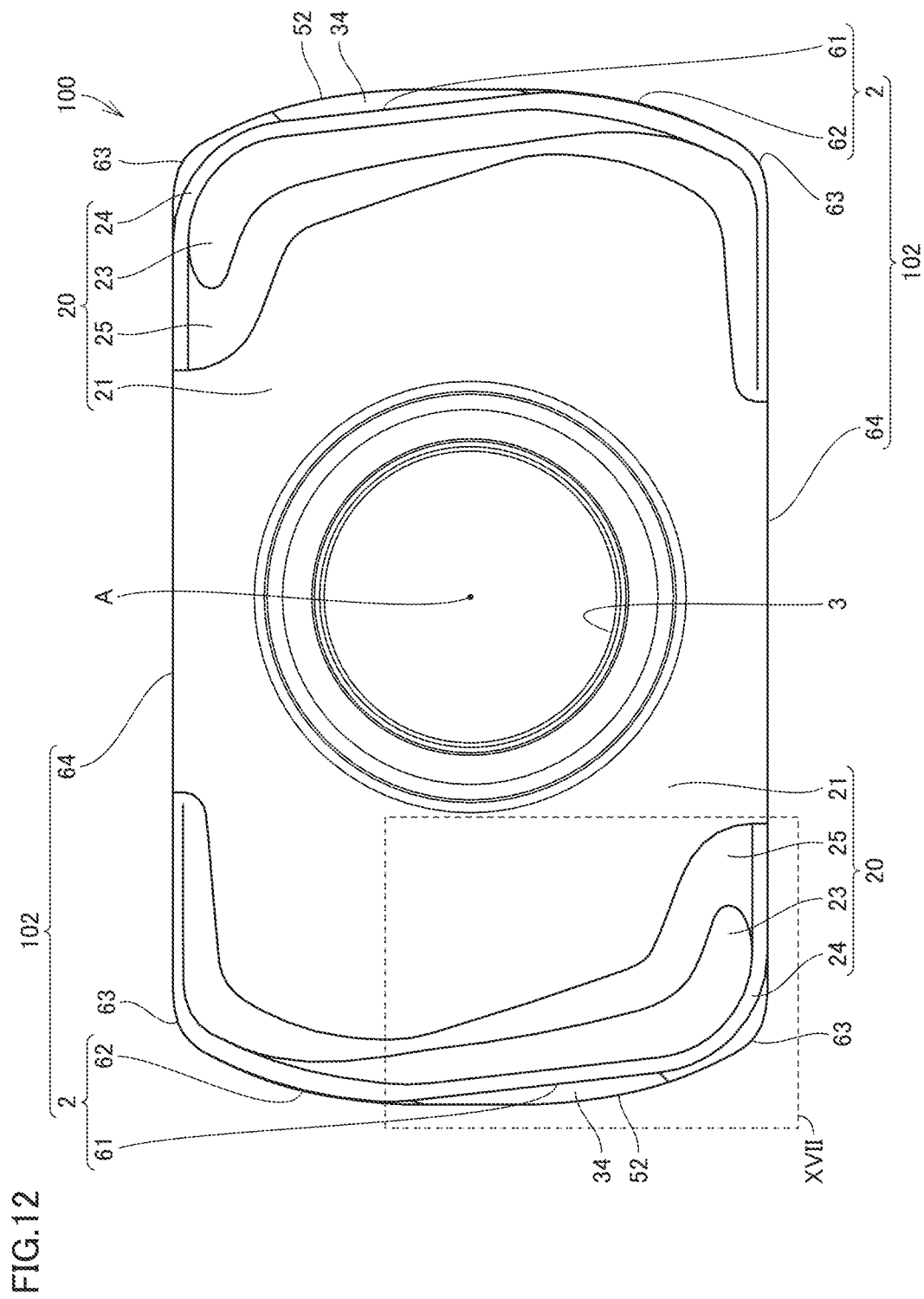
FIG. 12 is a schematic rear view showing the configuration of the cutting insert for the rotary cutting tool in accordance with the third embodiment.

FIG. 12 is a schematic rear view showing the configuration of cutting insert 100 for the rotary cutting tool in accordance with the third embodiment. As shown in FIG. 12, second surface 20 includes second seating surface 21, a fourth inclined surface 25, second inclined surface 23, and second land surface 24. Second seating surface 21 has a shape of a flat surface. Second seating surface 21 may be contiguous to inner circumferential surface 3. As shown in FIG. 12, when viewed in a direction from second surface 20 toward first surface 10, second seating surface 21 has an annular shape. Fourth inclined surface 25 is contiguous to second seating surface 21. Fourth inclined surface 25 is located outside second seating surface 21.

As shown in FIG. 12, second inclined surface 23 is contiguous to fourth inclined surface 25. Second inclined surface 23 is located outside fourth inclined surface 25. Second land surface 24 is contiguous to second inclined surface 23. Second land surface 24 is located outside second inclined surface 23. Second land surface 24 is contiguous to outer circumferential surface 30. A ridgeline between second land surface 24 and outer circumferential surface 30 constitutes second cutting edge 2. Second seating surface 21 may be contiguous to outer circumferential surface 30. A ridgeline between second seating surface 21 and outer circumferential surface 30 constitutes a second straight line portion 64.

As shown in FIG. 12, a ridgeline between second surface 20 and outer circumferential surface 30 (second ridgeline 102) includes second cutting edge 2 and second straight line portion 64. Second cutting edge 2 includes second main cutting edge portion 61 and second sub cutting edge portion 62. In the circumferential direction, second main cutting edge portion 61, second sub cutting edge portion 62, and second straight line portion 64 are alternately located. In cutting insert 100 in the third embodiment, second cutting edge 2 has two second main cutting edge portions 61 and two second sub cutting edge portions 62. When viewed in the direction from second surface 20 toward first surface 10, second sub cutting edge portion 62 has a shape of a curved line. Second sub cutting edge portion 62 has an arc shape, for example. When viewed from inner circumferential surface 3, second sub cutting edge portion 62 has a shape protruding outward.

As shown in FIG. 12, the ridgeline between second surface 20 and outer circumferential surface 30 (second ridgeline 102) is substantially a rectangle. From another viewpoint, second ridgeline 102 has four second corner portions 63. Second corner portion 63 is located between second main cutting edge portion 61 and second straight line portion 64, for example. When viewed in the direction from second surface 20 toward first surface 10, second ridgeline 102 has a shape with a rotational symmetry of 180° about central axis A. From another viewpoint, the shape obtained by rotating second ridgeline 102 by 180° about central axis A matches the shape of second ridgeline 102. It should be noted that central axis A is a straight line which passes through the center of through hole 5 and is perpendicular to second seating surface 21.

Figure 13:
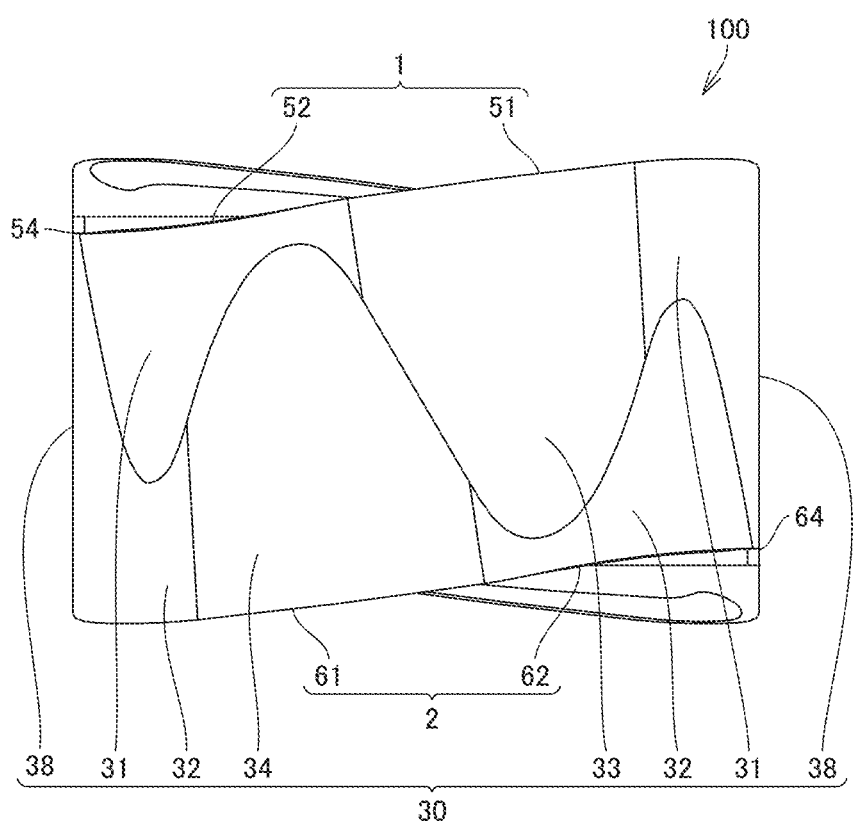
FIG. 13 is a schematic side view showing the configuration of the cutting insert for the rotary cutting tool in accordance with the third embodiment.

FIG. 13 is a schematic side view showing the configuration of cutting insert 100 for the rotary cutting tool in accordance with the third embodiment. As shown in FIG. 13, outer circumferential surface 30 mainly has third seating surface 33, fourth seating surface 34, first outer circumferential surface portion 31, second outer circumferential surface portion 32, and a fifth seating surface 38. Third seating surface 33 has a shape of a flat surface. Third seating surface 33 is located between first main cutting edge portion 51 and second sub cutting edge portion 62. Third seating surface 33 is contiguous to first main cutting edge portion 51. Third seating surface 33 is spaced from second sub cutting edge portion 62. Fourth seating surface 34 has a shape of a flat surface. Fourth seating surface 34 is located between second main cutting edge portion 61 and first sub cutting edge portion 52. Fourth seating surface 34 is contiguous to second main cutting edge portion 61. Fourth seating surface 34 is spaced from first sub cutting edge portion 52. Fifth seating surface 38 has a shape of a flat surface. Fifth seating surface 38 is located between first straight line portion 54 and second straight line portion 64. Fifth seating surface 38 is contiguous to first straight line portion 54 and second straight line portion 64.

As shown in FIG. 13, first outer circumferential surface portion 31 is contiguous to first cutting edge 1. Second outer circumferential surface portion 32 is contiguous to second cutting edge 2. First outer circumferential surface portion 31 may be contiguous to each of fifth seating surface 38, third seating surface 33, and fourth seating surface 34. First outer circumferential surface portion 31 may be located between fourth seating surface 34 and first sub cutting edge portion 52. Second outer circumferential surface portion 32 may be contiguous to each of fifth seating surface 38, third seating surface 33, and fourth seating surface 34. Second outer circumferential surface portion 32 may be located between third seating surface 33 and second sub cutting edge portion 62. Each of first outer circumferential surface portion 31 and second outer circumferential surface portion 32 has a shape of a curved surface, for example. When viewed from central axis A, each of first outer circumferential surface portion 31 and second outer circumferential surface portion 32 may be a curved surface protruding outward, for example.

Figure 14:
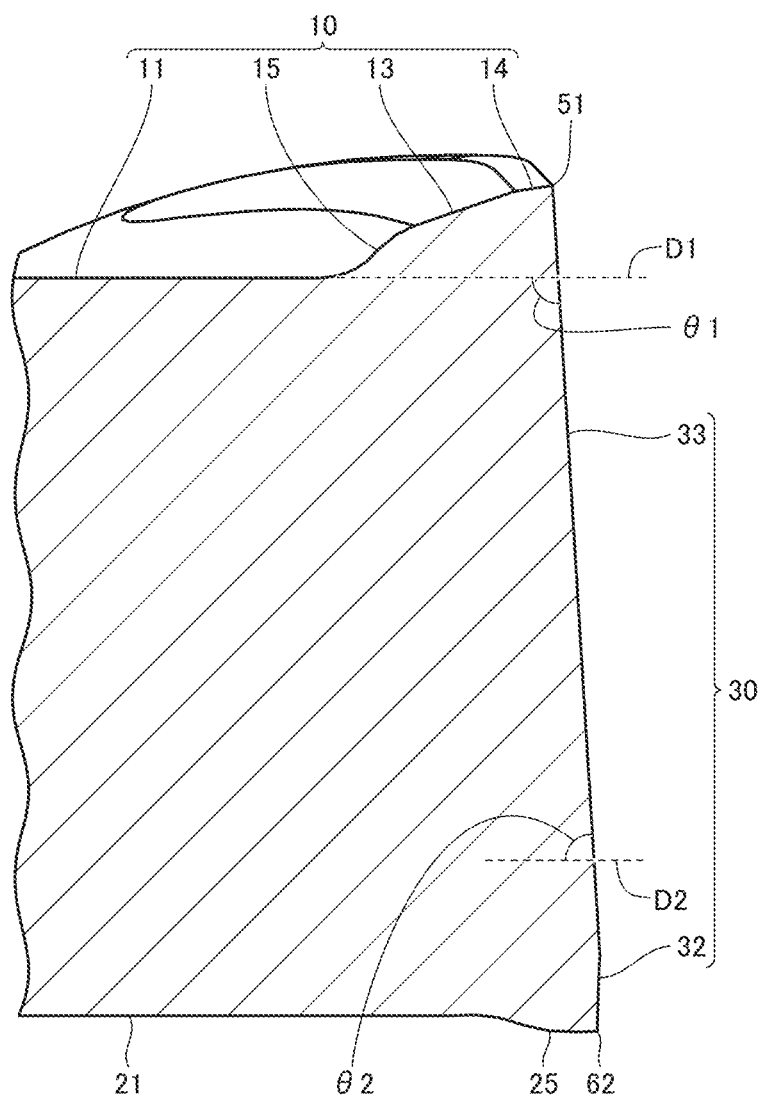
FIG. 14 is a schematic cross sectional view taken along a line XIV-XIV in FIG. 11.

FIG. 14 is a schematic cross sectional view taken along a line XIV-XIV in FIG. 11. The cross section shown in FIG. 14 is a cross section which is parallel to the direction from first surface 10 toward second surface 20 and which intersects first main cutting edge portion 51, third seating surface 33, and second sub cutting edge portion 62 (a first cross section). As shown in FIG. 14, in the first cross section, an angle formed between third seating surface 33 and first seating surface 11 (first angle $\theta 1$) may be an obtuse angle, and an angle formed between third seating surface 33 and second seating surface 21 (second angle $\theta 2$) may be an acute angle. The angle formed between third seating surface 33 and first seating surface 11 (first angle $\theta 1$) is an angle formed between third seating surface 33 and first straight line D1 extending along first seating surface 11. The angle formed between third seating surface 33 and second seating surface 21 (second angle $\theta 2$) is an angle formed between third seating surface 33 and second straight line D2 parallel to second seating surface 21.

First angle $\theta 1$ is 91° or more and 95° or less, for example. The lower limit of first angle $\theta 1$ is not particularly limited, and may be 91.5° or more, or 92° or more, for example. The upper limit of first angle $\theta 1$ is not particularly limited, and may be 94.5° or less, or 94° or less, for example.

Second angle $\theta 2$ is 85° or more and 89° or less, for example. The lower limit of second angle $\theta 2$ is not particularly limited, and may be 85.5° or more, or 86° or more, for example. The upper limit of second angle $\theta 2$ is not particularly limited, and may be 88.5° or less, or 88° or less, for example.

As shown in FIG. 14, first inclined surface 13 is inclined relative to first land surface 14. First inclined surface 13 is inclined relative to third inclined surface 15. Third inclined surface 15 is inclined relative to first seating surface 11. Third inclined surface 15 is inclined upward relative to first seating surface 11. First inclined surface 13 is inclined upward relative to first seating surface 11. It should be noted that upward is a direction from second seating surface 21 toward first seating surface 11. First land surface 14 is inclined downward relative to first inclined surface 13. In the first cross section, fourth inclined surface 25 is inclined downward relative to second seating surface 21. It should be noted that downward is a direction from first seating surface 11 toward second seating surface 21.

Figure 15:
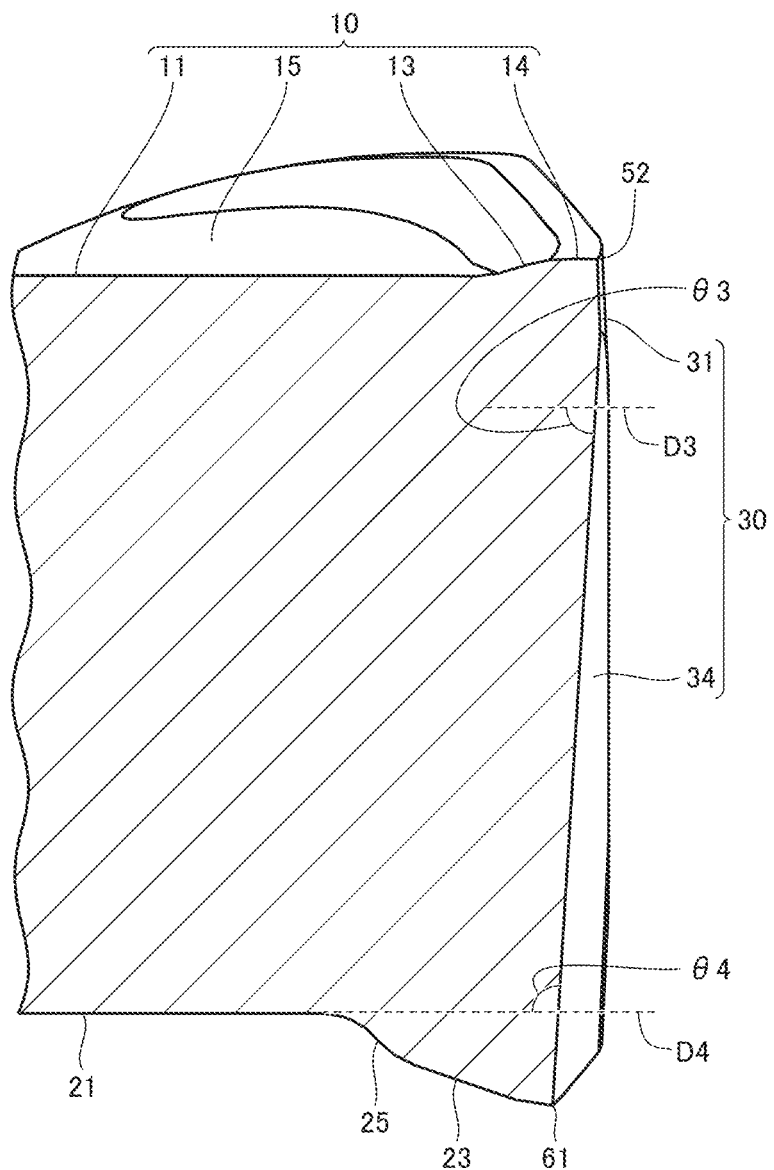
FIG. 15 is a schematic cross sectional view taken along a line XV-XV in FIG. 11.

FIG. 15 is a schematic cross sectional view taken along a line XV-XV in FIG. 11. The cross section shown in FIG. 15 is a cross section which is parallel to the direction from first surface 10 toward second surface 20 and which intersects second main cutting edge portion 61, fourth seating surface 34, and first sub cutting edge portion 52 (a second cross section). As shown in FIG. 15, in the second cross section, an angle formed between fourth seating surface 34 and first seating surface 11 (third angle $\theta 3$) may be an acute angle, and an angle formed between fourth seating surface 34 and second seating surface 21 (fourth angle $\theta 4$) may be an obtuse angle. The angle formed between fourth seating surface 34 and first seating surface 11 (third angle $\theta 3$) is an angle formed between fourth seating surface 34 and third straight line D3 parallel to first seating surface 11. The angle formed between fourth seating surface 34 and second seating surface 21 (fourth angle $\theta 4$) is an angle formed between fourth seating surface 34 and fourth straight line D4 extending along second seating surface 21.

Third angle $\theta 3$ is 85° or more and 89° or less, for example. The lower limit of third angle $\theta 3$ is not particularly limited, and may be 85.5° or more, or 86° or more, for example. The upper limit of third angle $\theta 3$ is not particularly limited, and may be 88.5° or less, or 88° or less, for example.

Fourth angle $\theta 4$ is 91° or more and 95° or less, for example. The lower limit of fourth angle $\theta 4$ is not particularly limited, and may be 91.5° or more, or 92° or more, for example. The upper limit of fourth angle $\theta 4$ is not particularly limited, and may be 94.5° or less, or 94° or less, for example.

As shown in FIG. 15, in the second cross section, first land surface 14 is inclined relative to first outer circumferential surface portion 31. First inclined surface 13 is inclined relative to first land surface 14. First inclined surface 13 is inclined relative to first seating surface 11. First inclined surface 13 is inclined upward relative to first seating surface 11. In the second cross section, fourth inclined surface 25 is inclined relative to second seating surface 21. Second inclined surface 23 is inclined relative to fourth inclined surface 25. Fourth inclined surface 25 is inclined downward relative to second seating surface 21. Second inclined surface 23 is inclined downward relative to second seating surface 21.

Figure 16:
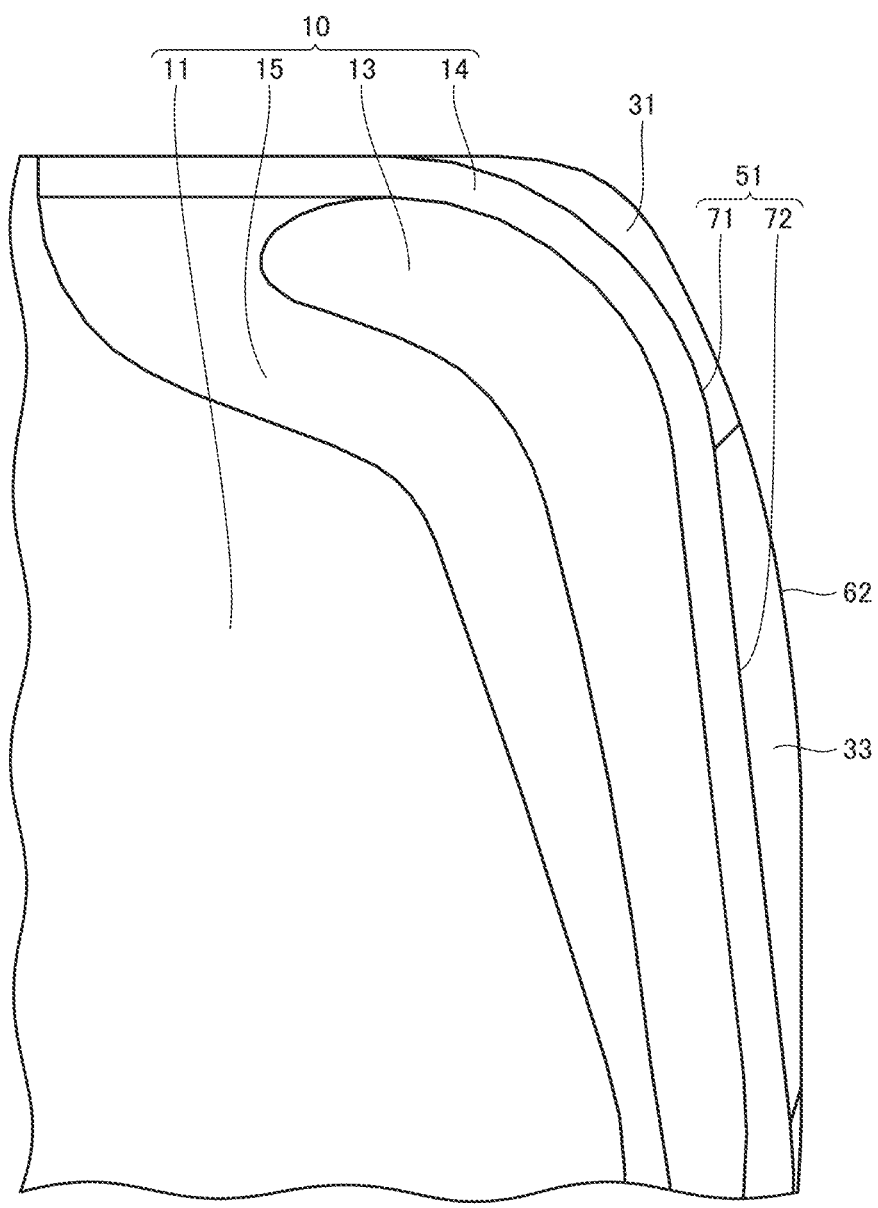
FIG. 16 is an enlarged view of a region XVI in FIG. 11.

FIG. 16 is an enlarged view of a region XVI in FIG. 11. As shown in FIG. 16, when viewed in the direction from first surface 10 toward second surface 20, at least a portion of second sub cutting edge portion 62 is located outside first main cutting edge portion 51. Second sub cutting edge portion 62 may be entirely located outside first main cutting edge portion 51. First main cutting edge portion 51 includes first portion 71 and second portion 72. Second portion 72 is contiguous to first portion 71. When viewed in the direction from first surface 10 toward second surface 20, first portion 71 has a shape of a curved line, for example. Second portion 72 has a shape of a straight line, for example. Second portion 72 may have a shape of a curved line, for example.

When viewed in the direction from first surface 10 toward second surface 20, at least a portion of second sub cutting edge portion 62 is located outside second portion 72 of first main cutting edge portion 51. First portion 71 is smoothly contiguous to second portion 72. From another viewpoint, when viewed in the direction from first surface 10 toward second surface 20, inclination of a tangent to first portion 71 and inclination of a tangent to second portion 72 change continuously at a boundary between first portion 71 and second portion 72.

Figure 17:
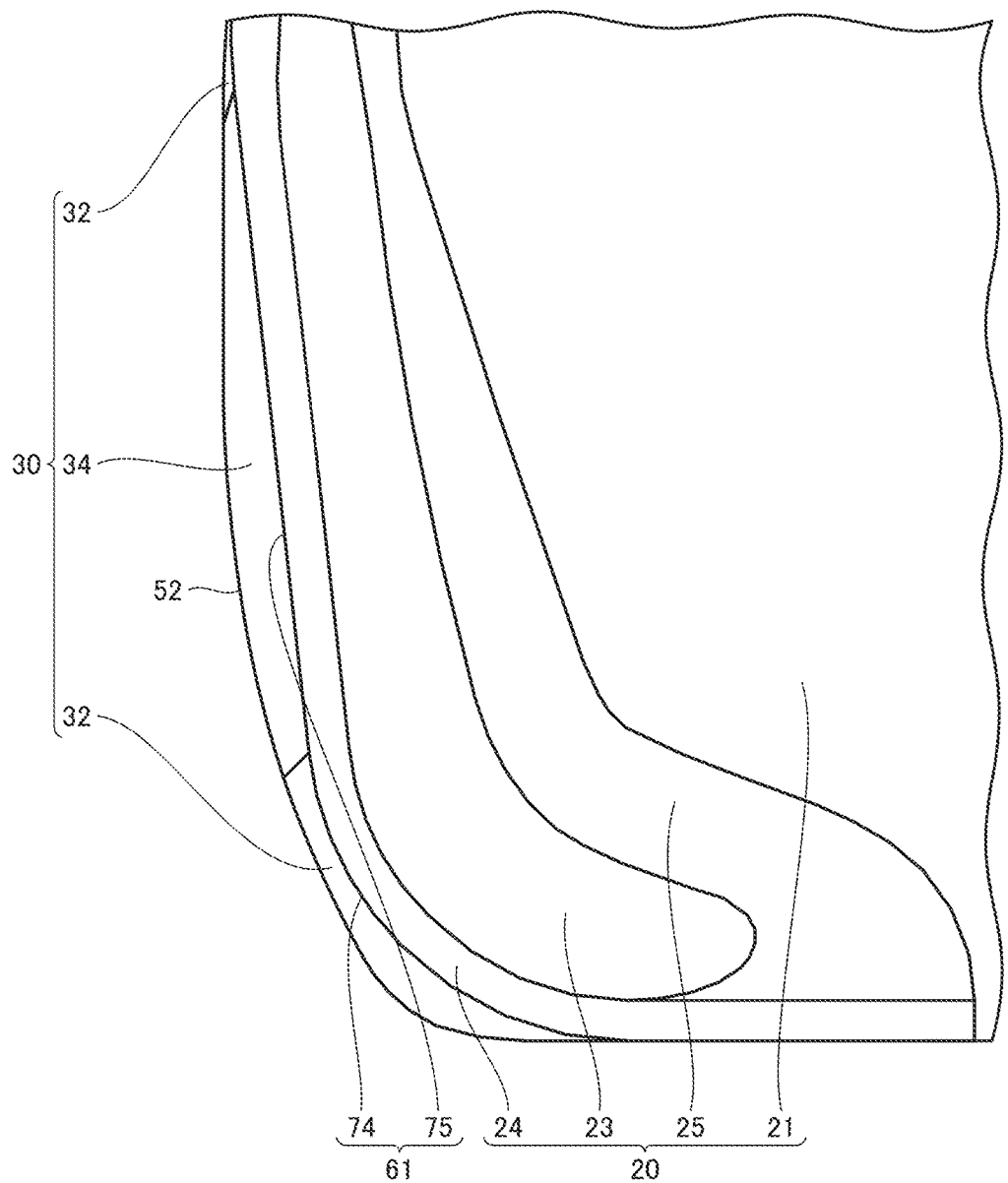
FIG. 17 is an enlarged view of a region XVII in FIG. 12.

FIG. 17 is an enlarged view of a region XVII in FIG. 12. As shown in FIG. 17, when viewed in the direction from second surface 20 toward first surface 10, at least a portion of first sub cutting edge portion 52 is located outside second main cutting edge portion 61. First sub cutting edge portion 52 may be entirely located outside second main cutting edge portion 61. Second main cutting edge portion 61 includes fourth portion 74 and fifth portion 75. Fifth portion 75 is contiguous to fourth portion 74. When viewed in the direction from second surface 20 toward first surface 10, fourth portion 74 has a shape of a curved line, for example. Fifth portion 75 has a shape of a straight line, for example. Fifth portion 75 may have a shape of a curved line, for example.

When viewed in the direction from second surface 20 toward first surface 10, at least a portion of first sub cutting edge portion 52 is located outside fifth portion 75 of second main cutting edge portion 61. Fourth portion 74 is smoothly contiguous to fifth portion 75. From another viewpoint, when viewed in the direction from second surface 20 toward first surface 10, inclination of a tangent to fourth portion 74 and inclination of a tangent to fifth portion 75 change continuously at a boundary between fourth portion 74 and fifth portion 75.

Fourth Embodiment

Next, a configuration of a rotary cutting tool in accordance with a fourth embodiment of the present disclosure will be described.

Figure 18:
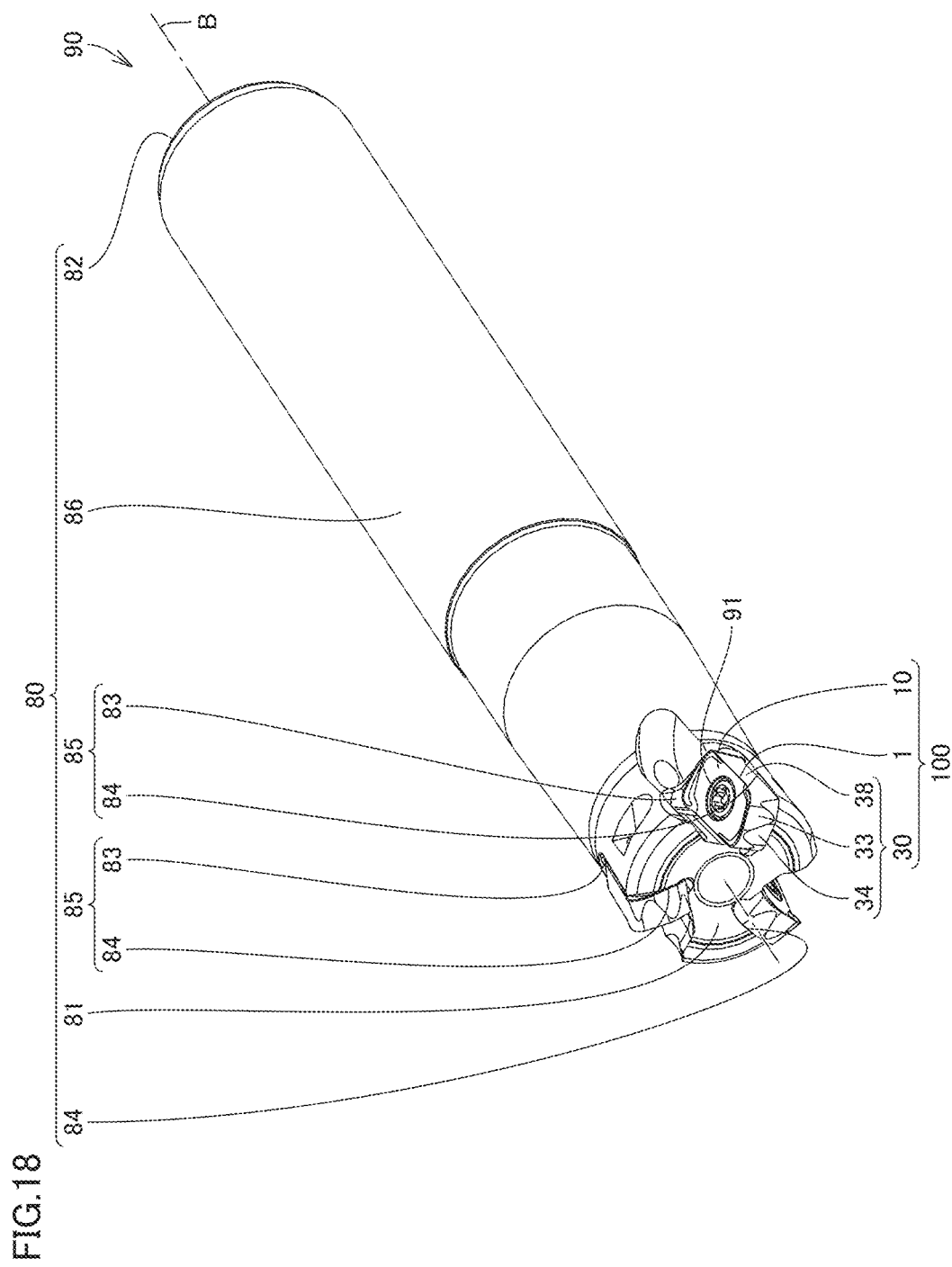
FIG. 18 is a schematic perspective view showing a configuration of a rotary cutting tool in accordance with a fourth embodiment.

FIG. 18 is a schematic perspective view showing a configuration of a rotary cutting tool in accordance with the fourth embodiment. As shown in FIG. 18, rotary cutting tool 90 in accordance with the fourth embodiment is a milling tool, for example. Rotary cutting tool 90 in accordance with the fourth embodiment has main body portion 80, cutting insert 100, and attachment screw 91. Rotary cutting tool 90 rotates about rotation axis B. Main body portion 80 holds cutting insert 100. Cutting insert 100 is, for example, cutting insert 100 in accordance with the third embodiment. In rotary cutting tool 90 in accordance with the fourth embodiment, three cutting inserts 100 are placed at regular intervals around rotation axis B.

Main body portion 80 has front end surface 81, back end surface 82, and outer circumferential side surface 86. Front end surface 81 is a portion which faces a workpiece. Back end surface 82 is located opposite to front end surface 81. Back end surface 82 is attached to a machine tool, for example. Outer circumferential side surface 86 is contiguous to each of front end surface 81 and back end surface 82.

Insert placement groove 85 is formed in main body portion 80. Insert placement groove 85 has first side wall surface 83 and second side wall surface 84. First side wall surface 83 is inclined relative to second side wall surface 84 to intersect second side wall surface 84 in a substantially perpendicular direction. First side wall surface 83 is contiguous to each of front end surface 81 and outer circumferential side surface 86. First side wall surface 83 is spaced from back end surface 82. Similarly, second side wall surface 84 is contiguous to each of front end surface 81 and outer circumferential side surface 86. Second side wall surface 84 is spaced from back end surface 82.

First side wall surface 83 is in contact with fourth seating surface 34 and fifth seating surface 38 of cutting insert 100. First side wall surface 83 may be in contact with third seating surface 33 of cutting insert 100. Second side wall surface 84 is in contact with second seating surface 21 of cutting insert 100. In cutting insert 100, attachment screw 91 is placed in through hole 5 of cutting insert 100. Cutting insert 100 is attached to main body portion 80 using attachment screw 91. Thereby, cutting insert 100 is fixed to main body portion 80.

Next, the function and effect of cutting insert 100 for the rotary cutting tool and rotary cutting tool 90 in accordance with the embodiments described above will be described.

Figure 19:
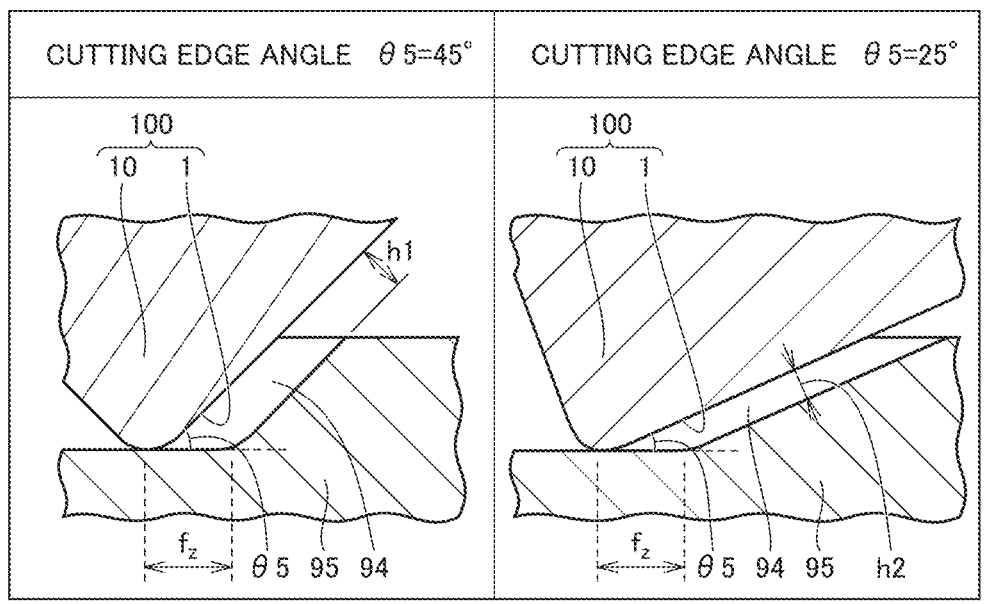
FIG. 19 is a schematic cross sectional view showing cutting states.

FIG. 19 is a schematic cross sectional view showing cutting states. The left side in FIG. 19 shows a cutting state in a case where a cutting edge angle θ5 is about 45°. The right side in FIG. 19 shows a cutting state in a case where cutting edge angle θ5 is about 25°. FIG. 19 shows a thickness of swarf 94 in a case where a workpiece 95 is cut using cutting insert 100. Cutting insert 100 cuts workpiece 95 in a direction perpendicular to the paper plane, while rotating about rotation axis B of rotary cutting tool 90. At the same time, cutting insert 100 is fed from left to right in the paper plane. A distance $f_z$ is a feed amount per cutting edge. The thickness of swarf 94 is determined as $\sin(\theta 5) \times f_z$. In the case where cutting edge angle θ5 is 45°, a thickness h1 of swarf 94 is about $0.71 \times f_z$. In the case where cutting edge angle θ5 is 25°, a thickness h2 of swarf 94 is about $0.42 \times f_z$. As shown in FIG. 19, when cutting edge angle θ5 becomes smaller, the thickness of swarf 94 becomes thinner. As a result, cutting resistance per unit length to be applied to first cutting edge 1 can be reduced. Further, since swarf 94 results from plastic deformation of workpiece 95, heat is generated from swarf 94. The heat generated by the plastic deformation is diffused from an interface in the vicinity of first cutting edge 1 of cutting insert 100 which contacts swarf 94, and an interface between swarf 94 and workpiece 95. When cutting edge angle θ5 becomes smaller, these interfaces have increased areas, and thus an increase in temperature in the vicinity of first cutting edge 1 can be suppressed.

Figure 20:
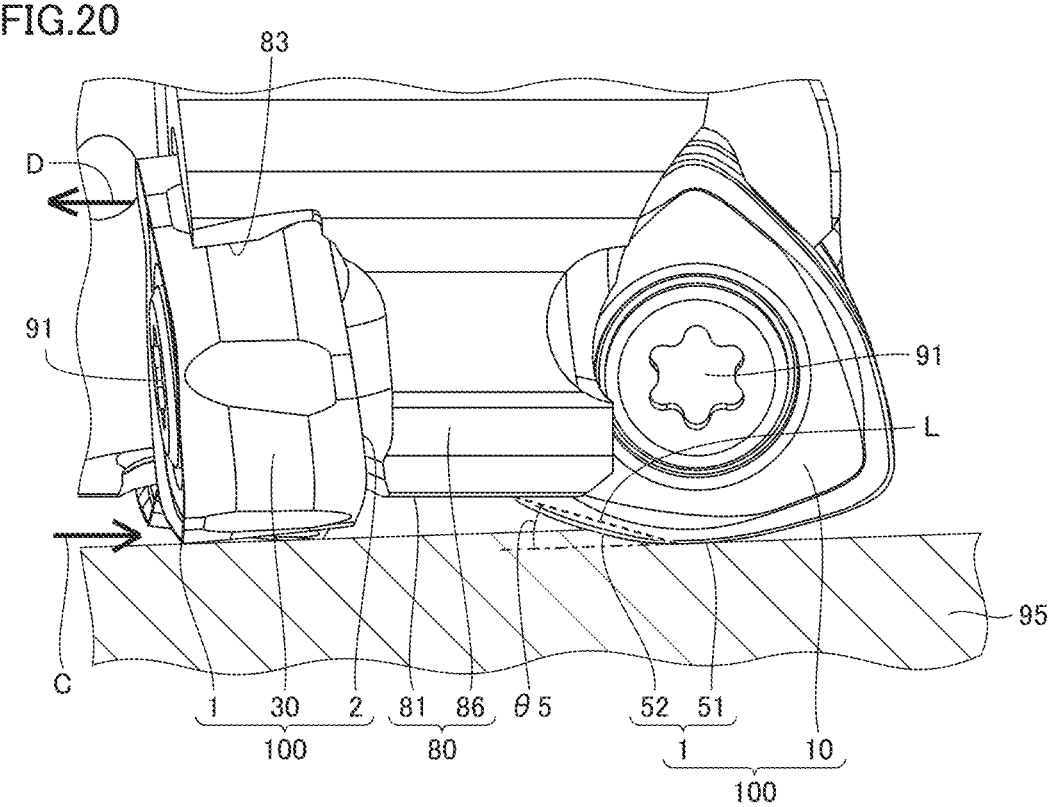
FIG. 20 is a schematic view showing a state where a workpiece is processed to be inclined using the cutting insert for the rotary cutting tool.

FIG. 20 is a schematic view showing a state where workpiece 95 is processed to be inclined using cutting insert 100 for the rotary cutting tool. In FIG. 20, a line segment L indicated by a broken line shows a case where first sub cutting edge portion 52 has a shape of a straight line. As shown in FIG. 20, in a case where first sub cutting edge portion 52 has a shape of a curved line, cutting edge angle θ5 of first sub cutting edge portion 52 can be reduced, when compared with the case where first sub cutting edge portion 52 has a shape of a straight line. In this case, the thickness of swarf 94 can be thinned. As a result, cutting resistance can be reduced. Therefore, an increase in the temperature of first sub cutting edge portion 52 can be suppressed.

According to cutting insert 100 for the rotary cutting tool in accordance with the embodiments described above, a ridgeline between first surface 10 and outer circumferential surface 30 includes first cutting edge 1. A ridgeline between second surface 20 and outer circumferential surface 30 includes second cutting edge 2. First surface 10 includes first seating surface 11 having a shape of a flat surface. Second surface 20 includes second seating surface 21 having a shape of a flat surface. First cutting edge 1 has first main cutting edge portion 51 and first sub cutting edge portion 52. Second cutting edge 2 has second main cutting edge portion 61 and second sub cutting edge portion 62. When viewed in a direction from first surface 10 toward second surface 20, each of first sub cutting edge portion 52 and second sub cutting edge portion 62 has a shape of a curved line. Thus, cutting edge angle θ5 can be reduced, when compared with a case where each of first sub cutting edge portion 52 and second sub cutting edge portion 62 has a shape of a straight line. In this case, the thickness of swarf 94 can be thinned. As a result, cutting resistance can be reduced. Therefore, an increase in the temperature of each of first sub cutting edge portion 52 and second sub cutting edge portion 62 can be suppressed. Hence, cutting insert 100 can have an extended life.

Further, according to cutting insert 100 for the rotary cutting tool in accordance with the embodiments described above, outer circumferential surface 30 includes third seating surface 33 having a shape of a flat surface. Cutting insert 100 is restrained by main body portion 80 by causing third seating surface 33 to abut on main body portion 80. In a case where third seating surface 33 has a shape of a flat surface, cutting insert 100 can be stably fixed to main body portion 80 even when a large cutting load is applied to cutting insert 100, when compared with a case where third seating surface 33 has a shape of a curved surface.

Furthermore, according to cutting insert 100 for the rotary cutting tool in accordance with the embodiments described above, when viewed in the direction from first surface 10 toward second surface 20, at least a portion of second sub cutting edge portion 62 is located outside first main cutting edge portion 51, and at least a portion of first sub cutting edge portion 52 is located outside second main cutting edge portion 61.

As shown in FIG. 20, when cutting insert 100 is attached to main body portion 80, first main cutting edge portion 51 is placed on a more outer circumferential side than first sub cutting edge portion 52. Thus, a larger cutting load is applied to first main cutting edge portion 51, when compared with that to first sub cutting edge portion 52. Similarly, second main cutting edge portion 61 is placed on a more outer circumferential side than second sub cutting edge portion 62. Thus, a larger cutting load is applied to second main cutting edge portion 61, when compared with that to second sub cutting edge portion 62. In a case where, when viewed in the direction from first surface 10 toward second surface 20, at least a portion of second sub cutting edge portion 62 is located outside first main cutting edge portion 51, and at least a portion of first sub cutting edge portion 52 is located outside second main cutting edge portion 61, each of first main cutting edge portion 51 and second main cutting edge portion 61 can have a higher strength, when compared with a case where at least a portion of second sub cutting edge portion 62 is located inside first main cutting edge portion 51, and at least a portion of first sub cutting edge portion 52 is located inside second main cutting edge portion 61. This can suppress each of first main cutting edge portion 51 and second main cutting edge portion 61 from being broken.

As shown in FIG. 20, when workpiece 95 is cut using cutting insert 100, a force acts on first cutting edge 1 which contacts workpiece 95, in a direction indicated by an arrow C. Cutting insert 100 is attached to main body portion 80 using attachment screw 91. Thus, a force in a direction indicated by an arrow D acts on attachment screw 91, at a portion opposite to first cutting edge 1. As a result, cutting insert 100 may float in the direction indicated by arrow D.

According to cutting insert 100 for the rotary cutting tool in accordance with the embodiments described above, in a cross section which is parallel to the direction from first surface 10 toward second surface 20 and which intersects first main cutting edge portion 51, third seating surface 33, and second sub cutting edge portion 62, an angle formed between third seating surface 33 and first seating surface 11 may be an obtuse angle, and an angle formed between third seating surface 33 and second seating surface 21 may be an acute angle. Thereby, cutting insert 100 can be placed in insert placement groove 85 such that first side wall surface 83 of main body portion 80 overlies third seating surface 33, when viewed in the direction along arrow D. Thus, first side wall surface 83 can suppress third seating surface 33 from moving in the direction indicated by arrow D. As a result, cutting insert 100 can be suppressed from floating from insert placement groove 85.

When the angle formed between third seating surface 33 and first seating surface 11 is extremely small, first side wall surface 83 of main body portion 80 cannot overlie third seating surface 33. According to cutting insert 100 for the rotary cutting tool in accordance with the embodiments described above, in the cross section which is parallel to the direction from first surface 10 toward second surface 20 and which intersects first main cutting edge portion 51, third seating surface 33, and second sub cutting edge portion 62, the angle formed between third seating surface 33 and first seating surface 11 may be 91° or more. This can effectively suppress occurrence of floating of cutting insert 100.

When the angle formed between third seating surface 33 and first seating surface 11 is extremely large, third seating surface 33 is likely to interfere with workpiece 95. According to cutting insert 100 for the rotary cutting tool in accordance with the embodiments described above, in the cross section which is parallel to the direction from first surface 10 toward second surface 20 and which intersects first main cutting edge portion 51, third seating surface 33, and second sub cutting edge portion 62, the angle formed between third seating surface 33 and first seating surface 11 may be 95° or less. This can suppress third seating surface 33 from interfering with workpiece 95.

According to cutting insert 100 for the rotary cutting tool in accordance with the embodiments described above, outer circumferential surface 30 may include flank face 36 located between first main cutting edge portion 51 and third seating surface 33. Flank face 36 may be inclined relative to third seating surface 33. This can suppress flank face 36 from interfering with main body portion 80 when third seating surface 33 is attached to main body portion 80.

According to cutting insert 100 for the rotary cutting tool in accordance with the embodiments described above, first main cutting edge portion 51 may include first portion 71, second portion 72 which is contiguous to first portion 71, and third portion 73 which is spaced from first portion 71 and is contiguous to second portion 72. Second main cutting edge portion 61 may include fourth portion 74, fifth portion 75 which is contiguous to fourth portion 74, and sixth portion 76 which is spaced from fourth portion 74 and is contiguous to fifth portion 75. Each of first portion 71, third portion 73, fourth portion 74, and sixth portion 76 may have a shape of a curved line. Thereby, cutting edge angle θ5 of each of first portion 71, third portion 73, fourth portion 74, and sixth portion 76 can be reduced, when compared with a case where each of first portion 71, third portion 73, fourth portion 74, and sixth portion 76 has a shape of a straight line. As a result, an increase in the temperature of each of first portion 71, third portion 73, fourth portion 74, and sixth portion 76 can be suppressed. Hence, cutting insert 100 can have an extended life.

According to cutting insert 100 for the rotary cutting tool in accordance with the embodiments described above, each of second portion 72 and fifth portion 75 may have a shape of a curved line. Thereby, cutting edge angle θ5 of each of second portion 72 and fifth portion 75 can be reduced, when compared with a case where each of second portion 72 and fifth portion 75 has a shape of a straight line. As a result, an increase in the temperature of each of second portion 72 and fifth portion 75 can be suppressed. Hence, cutting insert 100 can have an extended life.

It should be understood that the embodiments disclosed herein are illustrative and non-restrictive in every respect. The scope of the present invention is defined by the scope of the claims, rather than the embodiments described above, and is intended to include any modifications within the scope and meaning equivalent to the scope of the claims.

REFERENCE SIGNS LIST

1: first cutting edge; 2: second cutting edge; 3: inner circumferential surface; 5: through hole; 10: first surface; 11: first seating surface; 12: first bottom surface; 13: first inclined surface; 14: first land surface; 15: third inclined surface; 20: second surface; 21: second seating surface; 22: second bottom surface; 23: second inclined surface; 24: second land surface; 25: fourth inclined surface; 30: outer circumferential surface; 31: first outer circumferential surface portion; 32: second outer circumferential surface portion; 33: third seating surface; 34: fourth seating surface; 35: third outer circumferential surface portion; 36: flank face (first flank face); 37: second flank face; 38: fifth seating surface; 51: first main cutting edge portion; 52: first sub cutting edge portion; 53: first corner portion; 54: first straight line portion; 61: second main cutting edge portion; 62: second sub cutting edge portion; 63: second corner portion; 64: second straight line portion; 71: first portion; 72: second portion; 73: third portion; 74: fourth portion; 75: fifth portion; 76: sixth portion; 80: main body portion; 81: front end surface; 82: back end surface; 83: first side wall surface; 84: second side wall surface; 85: insert placement groove; 86: outer circumferential side surface; 90: rotary cutting tool; 91: attachment screw; 94: swarf; 95: workpiece; 100: cutting insert for rotary cutting tool (cutting insert); 101: first ridgeline; 102: second ridgeline; A: central axis; B: rotation axis; C, D: arrow; D1: first straight line; D2: second straight line; D3: third straight line; D4: fourth straight line; L: line segment; $f_z$: distance; h1, h2: thickness; θ1: first angle; θ2: second angle; θ3: third angle; θ4: fourth angle; θ5: cutting edge angle.

The invention claimed is:

1. A cutting insert for a rotary cutting tool, the cutting insert comprising:
a first surface;
a second surface opposite to the first surface;
an outer circumferential surface which is contiguous to each of the first surface and the second surface; and
an inner circumferential surface which is inside the outer circumferential surface and constitutes a through hole, wherein
a ridgeline between the first surface and the outer circumferential surface includes a first cutting edge,
a ridgeline between the second surface and the outer circumferential surface includes a second cutting edge,
the first surface includes a first seating surface having a shape of a flat surface,
the second surface includes a second seating surface having a shape of a flat surface,
the first cutting edge has a first main cutting edge portion and a first sub cutting edge portion,
the second cutting edge has a second main cutting edge portion and a second sub cutting edge portion,
when viewed in a direction from the first surface toward the second surface, at least a portion of the second sub cutting edge portion is located outside the first main cutting edge portion, and at least a portion of the first sub cutting edge portion is located outside the second main cutting edge portion,
when viewed in the direction from the first surface toward the second surface, each of the first sub cutting edge portion and the second sub cutting edge portion has a shape of a curved line, and
the outer circumferential surface includes a third seating surface having a shape of a flat surface,
in a cross section which is parallel to the direction from the first surface toward the second surface and which intersects the first main cutting edge portion, the third seating surface, and the second sub cutting edge portion, an angle formed between the third seating surface and the first seating surface is an obtuse angle, and an angle formed between the third seating surface and the second seating surface is an acute angle,
the outer circumferential surface includes a flank face which is located between the first main cutting edge portion and the third seating surface, and
the flank face is inclined toward the through hole relative to the third seating surface.

2. The cutting insert for the rotary cutting tool according to claim 1, wherein, in the cross section which is parallel to the direction from the first surface toward the second surface and which intersects the first main cutting edge portion, the third seating surface, and the second sub cutting edge portion, the angle formed between the third seating surface and the first seating surface is 91° or more and 95° or less.

3. The cutting insert for the rotary cutting tool according to claim 1, wherein, when viewed in the direction from the first surface toward the second surface, the ridgeline between the first surface and the outer circumferential surface has a shape with a rotational symmetry of 120° about a central axis.

4. The cutting insert for the rotary cutting tool according to claim 1, wherein
the first main cutting edge portion includes a first portion, a second portion which is contiguous to the first portion, and a third portion which is spaced from the first portion and is contiguous to the second portion,
the second main cutting edge portion includes a fourth portion, a fifth portion which is contiguous to the fourth portion, and a sixth portion which is spaced from the fourth portion and is contiguous to the fifth portion, and
each of the first portion, the third portion, the fourth portion, and the sixth portion has a shape of a curved line.

5. The cutting insert for the rotary cutting tool according to claim 4, wherein each of the second portion and the fifth portion has a shape of a straight line.

6. The cutting insert for the rotary cutting tool according to claim 4, wherein each of the second portion and the fifth portion has a shape of a curved line.

7. A rotary cutting tool comprising:
the cutting insert for the rotary cutting tool according to claim 1; and
a main body portion that holds the cutting insert for the rotary cutting tool.

8. A cutting insert for a rotary cutting tool, the cutting insert comprising:
a first surface;
a second surface opposite to the first surface; and
an outer circumferential surface which is contiguous to each of the first surface and the second surface, wherein a ridgeline between the first surface and the outer circumferential surface includes a first cutting edge and a first straight line portion, a ridgeline between the second surface and the outer circumferential surface includes a second cutting edge and a second straight line portion, the first surface includes a first seating surface having a shape of a flat surface, the second surface includes a second seating surface having a shape of a flat surface, the first cutting edge includes a first main cutting edge portion and a first sub cutting edge portion, the second cutting edge includes a second main cutting edge portion and a second sub cutting edge portion, when viewed in a direction from the first surface toward the second surface, at least a portion of the second sub cutting edge portion is located outside the first main cutting edge portion, and at least a portion of the first sub cutting edge portion is located outside the second main cutting edge portion, when viewed in the direction from the first surface toward the second surface, each of the first sub cutting edge portion and the second sub cutting edge portion has a shape of a curved line, the outer circumferential surface includes
- a third seating surface having a shape of a flat surface, being located between the first main cutting edge portion and the second sub cutting edge portion, and being contiguous to the first main cutting edge portion,
- a fourth seating surface having a shape of a flat surface, being located between the second main cutting edge portion and the first sub cutting edge portion, and being contiguous to the second main cutting edge portion, and
- a fifth seating surface having a shape of a flat surface, being located between the first straight line portion and the second straight line portion, and being contiguous to the first straight line portion and the second straight line portion, in a cross section which is parallel to the direction from the first surface toward the second surface and which intersects the first main cutting edge portion, the third seating surface, and the second sub cutting edge portion, an angle formed between the third seating surface and the first seating surface is an obtuse angle, and an angle formed between the third seating surface and the second seating surface is an acute angle, when viewed in the direction from the first surface toward the second surface, in a circumferential direction, the first main cutting edge portion, the first sub cutting edge portion, and the first straight line portion are alternately located, when viewed in a direction from the second surface toward the first surface, in the circumferential direction, the second main cutting edge portion, the second sub cutting edge portion, and the second straight line portion are alternately located, and when viewed in the direction from the first surface toward the second surface, the ridgeline between the first surface and the outer circumferential surface has a shape with a rotational symmetry of 180° about a central axis.

9. The cutting insert for the rotary cutting tool according to claim 8, wherein, in the cross section which is parallel to the direction from the first surface toward the second surface and which intersects the first main cutting edge portion, the third seating surface, and the second sub cutting edge portion, the angle formed between the third seating surface and the first seating surface is 91° or more and 95° or less.

10. The cutting insert for the rotary cutting tool according to claim 8, wherein
the first main cutting edge portion includes a first portion and a second portion which is contiguous to the first portion,
the second main cutting edge portion includes a fourth portion and a fifth portion which is contiguous to the fourth portion, and
each of the first portion and the fourth portion has a shape of a curved line.

11. The cutting insert for the rotary cutting tool according to claim 10, wherein each of the second portion and the fifth portion has a shape of a straight line.

12. The cutting insert for the rotary cutting tool according to claim 10, wherein each of the second portion and the fifth portion has a shape of a curved line.

13. A rotary cutting tool comprising:
the cutting insert for the rotary cutting tool according to claim 11; and
a main body portion that holds the cutting insert for the rotary cutting tool.

* * * * *

UNITED STATES PATENT AND TRADEMARK OFFICE
CERTIFICATE OF CORRECTION

PATENT NO. : 12,064,821 B2
APPLICATION NO. : 17/607032
DATED : August 20, 2024
INVENTOR(S) : Shota Tsujimoto It is certified that error appears in the above-identified patent and that said Letters Patent is hereby corrected as shown below:

In the Claims

Claim 13, Column 24, Line 43, "claim 11; and" should read --claim 8; and--.

Signed and Sealed this
Eleventh Day of February, 2025

Coke Morgan Stewart
*Acting Director of the United States Patent and Trademark Office*